US008505955B2

(12) United States Patent
Kramer

(10) Patent No.: US 8,505,955 B2
(45) Date of Patent: Aug. 13, 2013

(54) COUPLING DEVICE AND METHOD

(75) Inventor: Rodney M. Kramer, Rockford, IL (US)

(73) Assignee: Remark Technologies, Inc., Rockford, IL (US)

( * ) Notice: Subject to any disclaimer, the term of this patent is extended or adjusted under 35 U.S.C. 154(b) by 264 days.

(21) Appl. No.: 13/023,420

(22) Filed: Feb. 8, 2011

(65) Prior Publication Data

US 2011/0193320 A1   Aug. 11, 2011

Related U.S. Application Data

(60) Provisional application No. 61/303,521, filed on Feb. 11, 2010.

(51) Int. Cl.
*B60D 1/06* (2006.01)
(52) U.S. Cl.
USPC .......................................... 280/511; 280/504
(58) Field of Classification Search
USPC ......................................... 280/504, 511, 512
See application file for complete search history.

(56) References Cited

U.S. PATENT DOCUMENTS

| | | | |
|---|---|---|---|
| 1,079,531 A | 11/1913 | Zahringer |
| 2,696,392 A | 12/1954 | Case |
| 2,755,105 A | 7/1956 | Wells |
| 3,260,541 A | 7/1966 | Sadler et al. |
| 4,063,834 A | 12/1977 | Hanson et al. |
| 4,198,080 A | 4/1980 | Carpenter |
| 4,657,276 A | 4/1987 | Hamerl |
| 4,813,810 A | 3/1989 | Suzuki |
| 4,908,916 A | 3/1990 | Berte |
| 5,219,436 A | 6/1993 | Abbott |
| 5,312,125 A | 5/1994 | Tsao |
| 6,290,606 B1 | 9/2001 | Hodson |
| 6,481,740 B1 | 11/2002 | Haase et al. |
| 7,017,948 B2 | 3/2006 | Sunohara et al. |
| 2009/0072516 A1 | 3/2009 | Kuenzel |

FOREIGN PATENT DOCUMENTS

EP   1 334 847 A1   8/2003

OTHER PUBLICATIONS

U.S. Appl. No. 11/148,860, filed Jun. 9, 2005, titled "Coupling Device," inventor: Rodney Kramer (22 pages).
Non-Final Office Action issued in the U.S. Appl. No. 11/148,860, mailed Mar. 27, 2007 (7 pages).
Website, Smalley Steel Ring Company, Smalley Steel Ring—Ring Properties, http://www.smalley.com/RingProperties.asp?PartNbr=VH-212, accessed Jan. 11, 2005 (1 page).
Notification of Transmittal of the International Search Report and the Written Opinion of the International Searching Authority, or the Declaration from the International Bureau of WIPO for International Application No. PCT/US2011/024179 dated Oct. 27, 2011, 10 pages.

*Primary Examiner* — Tashiana Adams
(74) *Attorney, Agent, or Firm* — Fitch, Even, Tabin & Flannery, LLP

(57) ABSTRACT

A coupling device is provided including a first coupling member or portion and second coupling member or portion where the second coupling member is configured to releasably engage the first coupling member. The second coupling member includes a locking sleeve or locking sleeve assembly slideably mounted on a cup body with the sleeve capable of being shifted toward an opening of the cup body to an unlocked position that permits insertion of the first coupling member into the second coupling member. The sleeve has an inner surface that covers and protects a fastening element positioned within bores of the cup body in both the locked and unlocked positions thereof. In one form, the locking sleeve assembly includes a locking device which restricts the sleeve from inadvertently shifting toward the unlocked position.

34 Claims, 23 Drawing Sheets

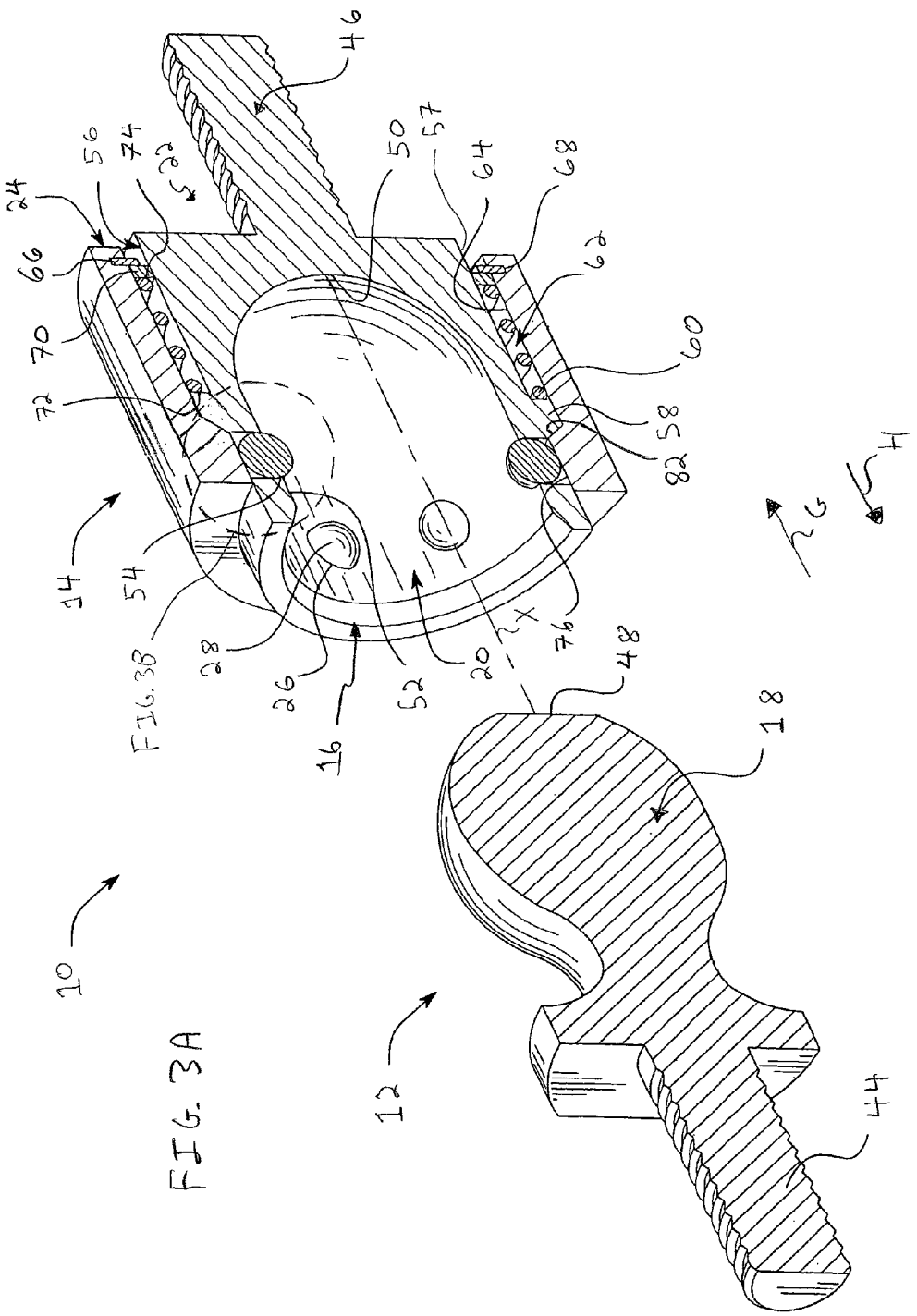

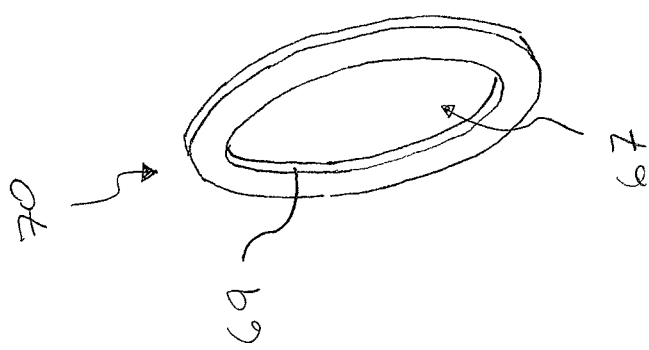

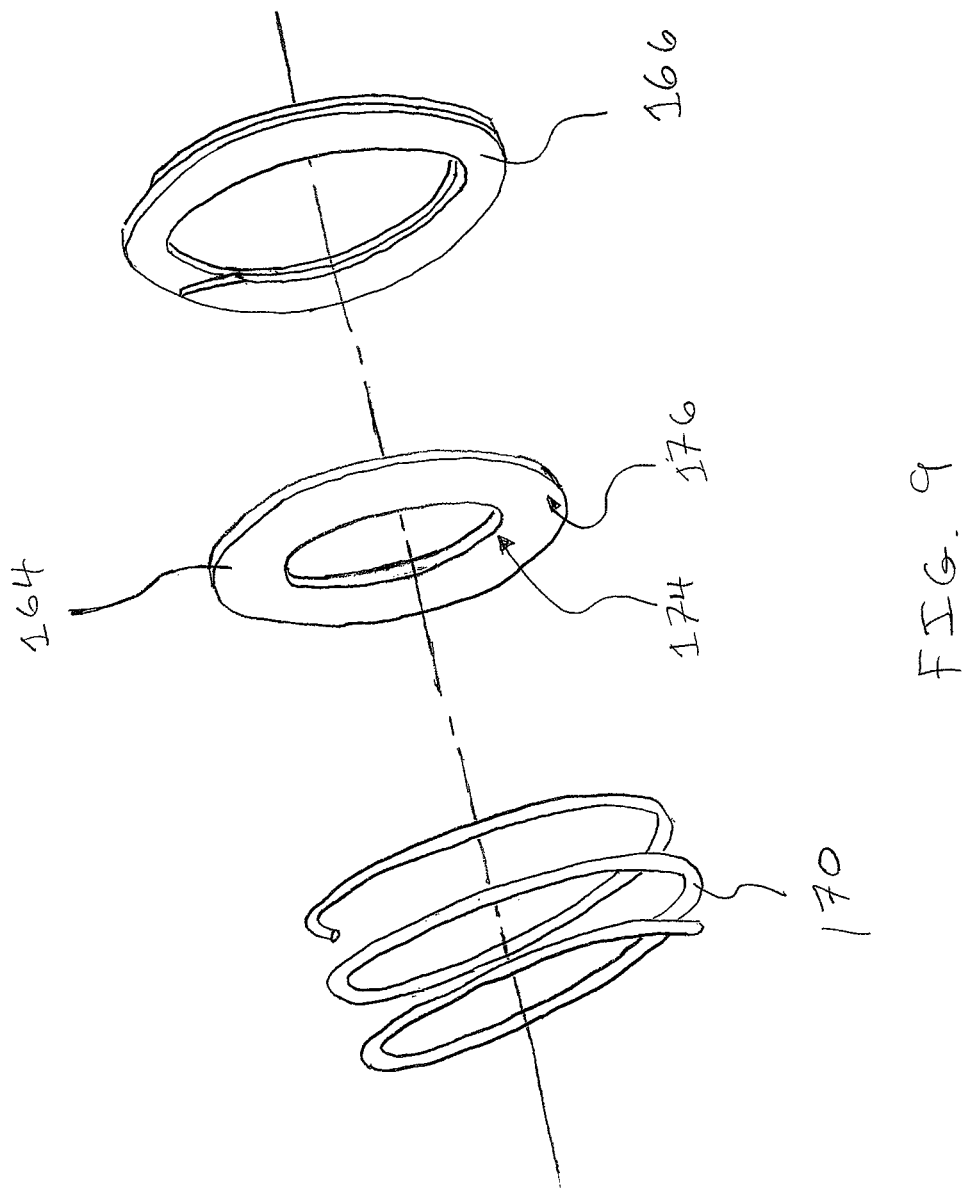

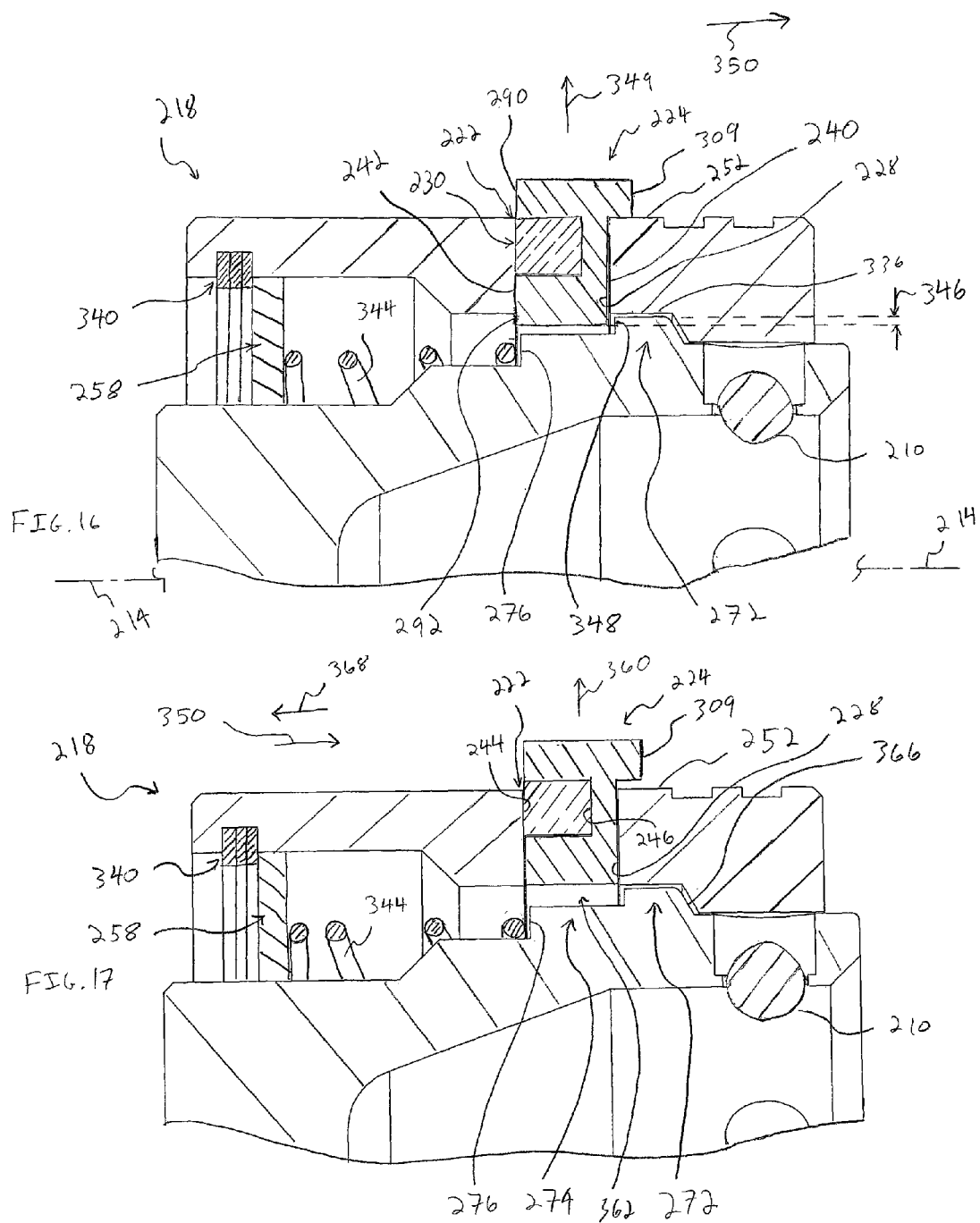

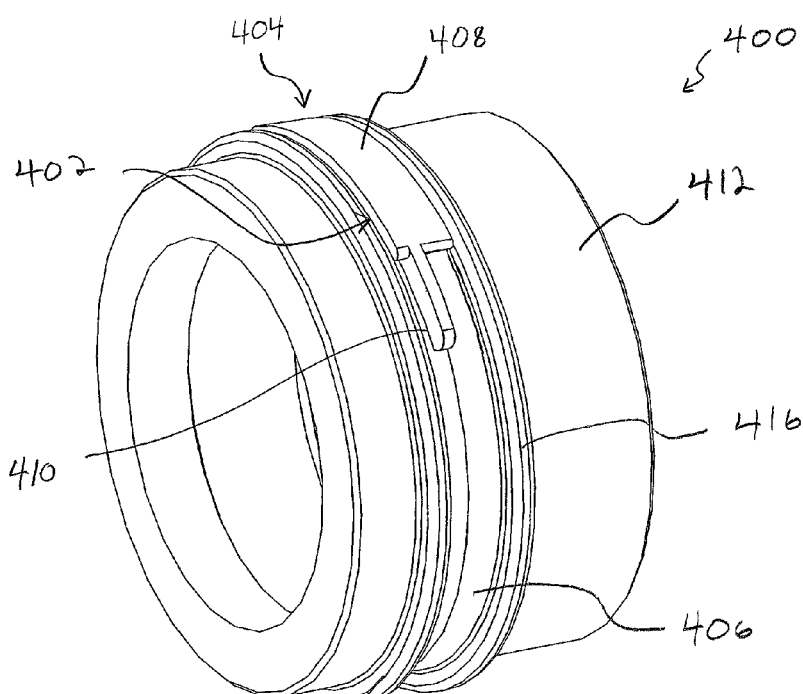
FIG. 20
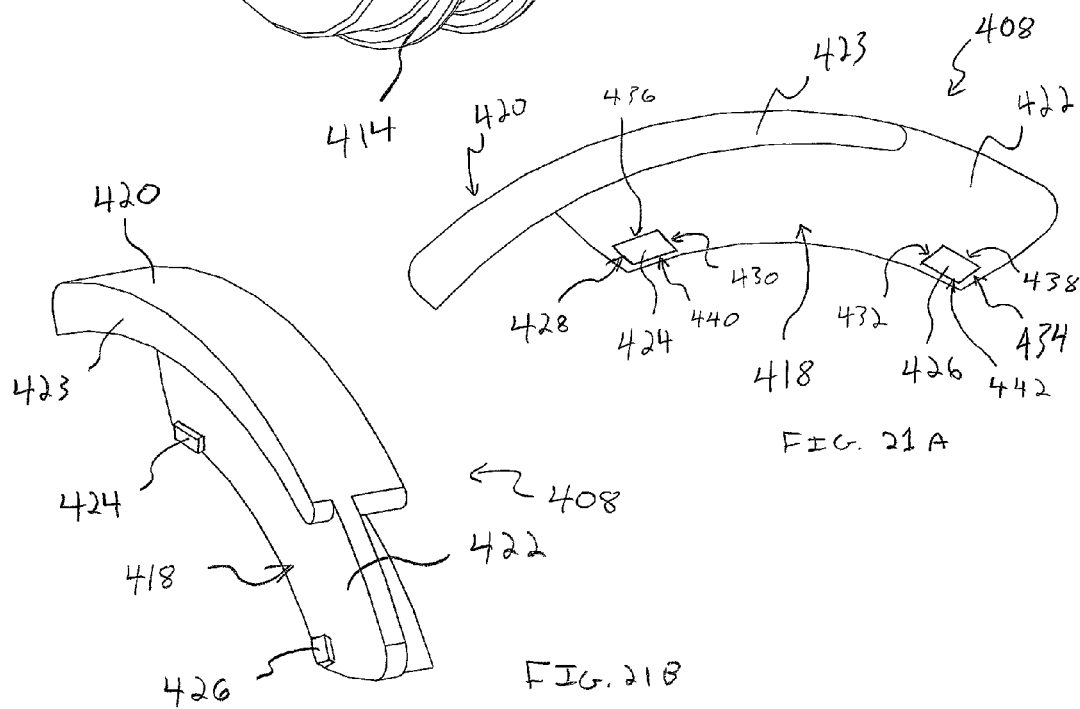
FIG. 21A
FIG. 21B

COUPLING DEVICE AND METHOD

CROSS REFERENCE TO RELATED APPLICATION

This application claims the benefit of U.S. Provisional Patent Application No. 61/303,521, filed Feb. 11, 2010, titled "Coupling Device and Methods," the entirety of which is hereby incorporated by reference.

FIELD OF THE INVENTION

The invention relates generally to a coupling device and method and, more particularly, to a coupling device and method that provide a releasable connection between first and second coupling members.

BACKGROUND OF THE INVENTION

Coupling devices, such as ball and socket coupling devices, can be used to connect a variety of objects, such as for example trailers to vehicles. The ball and socket connection permits relative movement between the trailer and the vehicle via rotation or pivoting of the ball within the socket. A traditional trailer hitch has the ball mounted to a hitch plate or rear bumper of the vehicle with the shank of the vehicle coupling member extending upwardly and having a ball formed at the upper end thereof, and the socket is mounted to a tongue of the trailer and has its opening facing downwardly. To couple the trailer to a hitch, the trailer tongue is first lifted up above the ball in order to align the trailer socket with the ball on the vehicle before the socket is lowered downwardly onto the ball. Once the ball is seated within the socket, locking elements or detent balls keep the ball and socket connected during operation of the powered vehicle.

One typical type of prior ball and socket coupling device utilizes a locking mechanism comprised of a ring or sleeve that is connected to the socket. In these devices, movement of the ring or sleeve shifts detent balls in the socket to engage or disengage the ball when the ball is seated within the socket. Though this approach permits relatively straightforward operation, these coupling devices suffer from a number of shortcomings.

One such problem is that existing coupling devices have a configuration that may allow debris or contamination from the surrounding environment to foul the ball. For example, in U.S. Pat. No. 2,696,392 to R. N. Case and U.S. Pat. No. 2,755,105 to Wells, ball and socket devices are described each including a body having a downwardly opening, spherical recess or socket connected to a trailer tongue and a coupling ball on the upper end of a shank connected to and extending upwardly from a car bumper for being received within the spherical recess of the body. The socket body has radial through passages extending through the wall of the socket body for receiving detent balls therein. These passages are configured to permit the ball bearings to translate and partially extend into the recess to lock the ball in the socket. Slideably mounted on the body is a ring or sleeve that is biased in a direction toward an access opening of the socket to a locked position and which is slideable in an opposite direction against the bias force away from the opening of the socket to an unlocked position where the detent balls can travel radially outward to allow the coupling ball to be seated within the socket. Releasing the sleeve causes it to shift back toward the socket opening to its locked position which locks the device by forcing the detent balls radially inward to extend partially into the socket, which secures the ball within the socket. However, sliding the sleeve away from the socket access opening to the unlocked position exposes the radial passages and detent balls therein to fouling from the surrounding environment. The exposure provides debris or other contaminants access to the passages. Additionally, if the sleeve is shifted too far away from the opening of the socket because the spring is worn, damaged, or overextended, the detent balls can actually fall out of the socket.

Another problem with existing coupling devices is due to the use of a coil spring for biasing the sleeve or ring to the locked position. In the '105 patent, sliding the ring away from the cup access opening compresses the coil spring and permits the detent balls to shift radially outwardly such that the spherical head may be inserted into or removed from the cup. The ring can be slid away from the cup access opening until the adjacent coils of the spring engage one another causing the coil spring to bottom-out. Such bottoming out of the spring provides a hard stop of the ring slid to the unlocked position thereof. However, fully compressing the spring every time the spherical head is inserted or removed from the cup repeatedly exposes the spring to excessive wear and tear and possible risk of deformation. This shortcoming may lead to spring failure or a reduced capacity of the spring to return the ring to its locked position.

Prior ball and socket coupling devices also pose additional problems with respect to the difficulty involved with connecting the ball to the socket. Specifically, the socket is connected to a trailer tongue to open downwardly and the ball is connected to a vehicle hitch plate via an upwardly projecting shank on which the ball is formed. The weight of the trailer tends to shift the trailer tongue downwardly, which moves the trailer socket downwardly onto the ball. With this hitch configuration as also shown by Wells and Case, to unlock the socket, the sleeve or ring on the trailer mounted socket is pulled back upwardly and away from the socket access opening and, thus, is shifted in an opposite direction of the natural downward movement of the trailer socket as it is lowered to receive the ball therewith. Thus, to seat the ball in the socket, a user has the difficult operation of pulling the ring or sleeve upwardly or away from the socket access opening while at the same time the trailer tongue and socket must be lowered downwardly in the opposite direction to seat the vehicle mounted coupling ball. In addition, the socket is often larger than the ball and when positioned over the ball and vehicle hitch plate, the large socket tends to visually obscure the ball when the user is aligning the ball and socket. Even once the socket is positioned onto the ball, existing devices further impede coupling by utilizing locking mechanisms that require pulling a ring in a direction which tends to separate the ball and socket.

Prior ball and socket devices also have the shortcoming that excessive force can, under some circumstances, shift the socket or ring to a position where the detent balls are released and the ball pin can be unintentionally unlocked from the socket resulting in locking failure. Such locking failure can occur when significant axial forces are created by abrupt changes in the orientation of the ball and socket devices. For example, a coupled ball and socket device between a vehicle and a trailer being transported through high-speed pothole collisions, abrupt bumps or other changes in the terrain, jerky motions due to driving conditions, or failure in the item being pulled, can experience significant axial forces that can overcome the bias of the socket ring resulting in locking failure. One attempt to overcome this problem would be to install a much heavier biasing member on the locking ring to provide a much larger biasing force to maintain the ring in the locked position. This solution, however, would greatly deter the ease of use of the ball and socket device because a much higher force would be needed by an operator to counter-bias the locking ring in order to unlock the device.

SUMMARY OF THE INVENTION

In accordance with one aspect, a trailer hitch coupling device is provided that utilizes a coupling device having a locking sleeve that is slid toward an access opening to its unlocked position. In this manner, the sleeve can be preferably configured to minimize the impact from fouling due to environmental exposure regardless of whether the coupling device is locked or unlocked. As discussed herein, this advantage is provided by the coupling device having a locking sleeve that is operable to protect or cover functional aspects thereof regardless of whether the device is in a locked or unlocked configuration.

In one form, the trailer hitch coupling device has a first hitch coupling portion with a head portion and a second hitch coupling portion with a receiving body having a central axis. The receiving body has a pocket through which the axis extends and is sized to receive the head portion of the first hitch coupling portion and includes an opening for providing the head portion access to the pocket. A wall of the receiving body extends about the pocket and has a locking sleeve slideably mounted thereon. At least one bore extends radially through the receiving body wall and receives a fastening element that is configured to translate within the bore. The second hitch coupling portion also includes a biasing member between the receiving body wall and the locking sleeve to urge the locking sleeve axially away from the receiving body opening to a locked position where the locking sleeve positions a portion of the fastening element to protrude into the bore for retaining the head portion therein. The locking sleeve is also axially slideable toward the receiving body opening to an unlocked position thereof against the bias of the biasing member to allow the fastening element to translate to an unlocked position removed from the pocket for allowing the head portion to be inserted in or removed from the pocket.

Unlike prior coupling devices, the locking sleeve of the devices provided herein is axially shifted toward the receiving body access opening to the unlocked position. Such configuration is advantageous over prior devices because it permits an inner surface of the locking sleeve to be sized and positioned to extend axially beyond the radially extending bore so that the inner surface covers the bore and the fastening element therein in both the locked and unlocked positions to provide cover or protection of the bores and fastening elements. Prior coupling devices utilize axial shifting of their lock rings away from the socket access opening to the unlocked position. In the prior devices, by shifting the lock ring away from the opening to the unlocked position, the inside of the bores and detent balls therein are exposed to the environment and fouling. Thus, the locking sleeve of the coupling devices herein are able to keep the exposure of the fastening elements in the bores to the surrounding environment to limit fouling thereof to a minimum.

In another form, a coupling device is provided that limits movement of a coil spring thereof to a range of motion less than full compression. By one approach, the coupling device includes a pin coupling member having a head portion and a cup coupling portion having a body with a central axis thereof. The body has a pocket through which the central axis extends, and the pocket is sized to receive the head portion of the pin member. The body also includes an opening for providing the pin head portion access to the pocket. The coupling device has a coil spring having coils that extends about the body and biases a locking sleeve slideably mounted to the body to a locked position which retains the head portion of the pin within the pocket. The cup body and the locking sleeve have stop surfaces that engage each other and limit travel of the locking sleeve toward the unlocked position.

The stop surfaces are arranged so that when engaged, the adjacent coils of the coil spring are not fully compressed against each other after the stops limit movement of the locking sleeve to the unlocked position. Thus, the stop surfaces are arranged to restrict spring compression to less than full compression, which limits the potential for undue wear and damage to the spring and generally increases the durability of the coupling device. Prior coupling devices only limit travel of the locking ring by relying on full compression or bottoming out of the coil spring to effect such stopping, which can introduce fatigue into the biasing member and limit the useful life of the spring. The coupling devices herein avoid this shortcoming via the stop surfaces of the cup body and locking sleeve.

In yet another aspect, an improved vehicle coupling system is provided for a trailer having a tongue and a vehicle for pulling the trailer. The vehicle coupling system includes a coupling member mounted to the trailer tongue to extend along a hitching axis and having a head portion depending below the trailer tongue. The coupling system also includes a cup body that is mounted to the vehicle and has a pocket thereof positioned so that the pocket is upwardly opening. This configuration stands in contrast to existing coupling systems, where a ball is connected to the vehicle and a socket is connected to the trailer with a downwardly facing socket. The improved vehicle coupling systems herein also have a locking mechanism mounted to the cup body so that with the cup body pocket positioned below the ball coupling member and the hitching axis extending through the pocket, the head portion of the coupling member can be lowered in a downward direction along the hitching axis to seat the head portion in the pocket with the locking mechanism operable to lock the head portion therein.

In this approach, the locking mechanism may also include a locking sleeve mounted to the cup body. The sleeve is operable to be slid in an upward direction along the hitching axis to the unlocked position. This motion of the sleeve is opposite to the downward direction in which the head portion is lowered into the pocket. The opposite movements of the head portion and sleeve along the hitching axis tend to bring the coupling member and cup body towards each other for coupling of the trailer to the vehicle. To this end, the improved vehicle coupling system generally uses the weight of the trailer tongue to naturally lower the ball head portion within the pocket, and at the same time, the shifting of the locking sleeve upwardly to the unlocked position also tends to draw the cup body upward toward the ball head portion to connect the cup body to the ball head portion in one fluid movement. Thus, the user shifts the locking sleeve upwardly in a coupling direction, which is the same direction that would naturally urge the cup body to receive the ball. Prior devices require the user to shift the locking sleeve in a direction that is opposite a coupling motion, which would tend to counteract the coupling operation. Thus, the vehicle coupling system is configured such that the user is allowed to shift the locking mechanism to an unlocked position in the same direction as the vehicle would tend to move during a hitching operation so as to help shift the vehicle toward the opposite, downward movement of the trailer to facilitate easier coupling thereof.

A method is also provided for hitching a trailer to a vehicle. The method includes the steps of first arranging a depending coupling member of the trailer over an upwardly opening cup member of the vehicle. This is opposite prior hitching operations where an upwardly projecting ball is mounted to a vehicle. Next, a locking sleeve, which is downwardly biased, is pulled upwardly along the cup member against its bias to allow locking elements to shift to unlocked positions. At this point, the coupling member can be seated in the cup member by either using the upward pulling force applied to the locking sleeve to pull the cup member upwardly toward the coupling member thereover, lowering the coupling member toward the cup member and the upwardly pulled locking sleeve, or a combination of both. Then, the locking sleeve is released to shift it downwardly and at the same time shift the locking elements to locked positions thereof for locking the coupling member in the cup member. Again, this is in contrast to prior coupling devices where the locking sleeve would be released and shifted upwardly to lock the device.

In accordance with yet another aspect, a locking device may be provided that is mounted to the locking sleeve for blocking unintended shifting of the locking sleeve between its locked and unlocked positions. In this aspect, the locking device may be configured for shifting relative to the locking sleeve between an interference position where a blocking portion thereof is positioned to block sliding of the locking sleeve along the cup body and a clearance position where the blocking portion is positioned to allow sliding of the locking sleeve between its locked and unlocked positions. By having the locking device mounted to the locking sleeve, it can be actuated using the same hand, and preferably an index finger or thumb of that hand, that is used to shift the locking sleeve between the locked and unlocked positions.

In one form, the locking device may be a lock button mounted to the locking sleeve having a radially inward blocking portion and a radially outward push button. To this end, the lock button may be configured to pivot relative to the locking sleeve so that in a first pivot position the radially inward blocking portion is radially positioned to block axial movement of the locking sleeve. Alternatively, when the radially outward push button is pushed, the lock button is configured to pivot to a second, opposite pivot position where the radially inward blocking portion is radially positioned to allow axial sliding of the locking sleeve along the socket or cup body. By one approach, the lock button may also include a pivot point configured so that lock button is capable of rocking back and forth thereabout from the first pivot position to the second pivot position.

By another approach, the locking device may also include a resilient member mounted to the locking sleeve for biasingly pivoting the lock button toward the first pivot position. Pushing the push button counter-biases the resilient member for shifting the blocking portion outward to the second pivot position. Preferably, the rocking or pivoting of the lock button is transverse to the axial sliding of the locking sleeve. In this manner, any significant axial forces or axial vibrating encountered by the coupling device during use would not affect the positioning of the blocking portion relative to the locking sleeve because it is configured to move or shift radially and transverse to such forces. As a result, the locking device keeps the head portion retained in the hitch coupling portion even when the coupling device experiences significant axial loading or other axial forces during use. In one form, the locking sleeve may also include a retention device or mechanism that retains the push button to the locking sleeve. The retention device is advantageous for situations should the resilient member break during use of the coupling device.

BRIEF DESCRIPTION OF THE DRAWINGS

FIG. 3A is a cross-sectional perspective view of the coupling device of FIG. 1 showing internal components of the second coupling member including a locking sleeve in a locked position prior to insertion of the first coupling member;

FIG. 3B is an enlarged, cross-sectional side elevational view of the coupling device of FIG. 3A showing a fastening element restrained within the second coupling member;

FIG. 9 is an exploded perspective view of a spring, support surface, and snap ring of the coupling device of FIG. 6;

FIG. 16 is a cross-sectional side elevational view taken across the line 16-16 in FIG. 11 showing the lock button in an interference position which restricts movement of the locking sleeve toward the opening of the cup body;

FIG. 17 is a cross-sectional view similar to FIG. 16 showing the lock button shifted to a clearance position which permits the locking sleeve to move toward the opening of the cup body;

FIG. 20 is a perspective view of a third locking sleeve assembly showing a pair of annular ribs which protect a biasing member and lock button mounted on the locking sleeve;

FIGS. 21A and 21B are views of a lock button showing a pair of retaining posts extending outwardly from the lock button at opposite ends thereof;

DETAILED DESCRIPTION OF THE PREFERRED EMBODIMENTS

Figure 1:
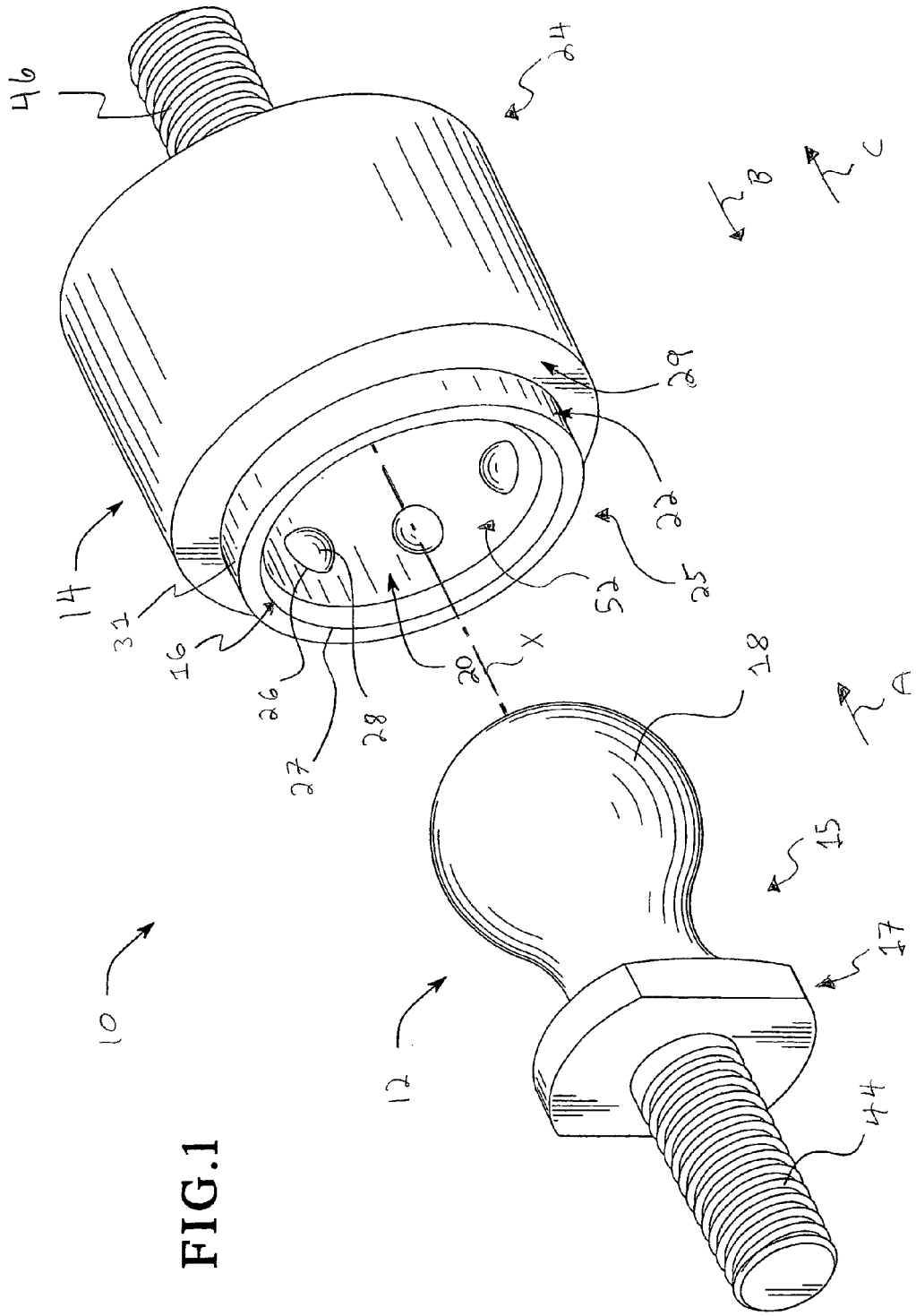
FIG. 1 is an exploded perspective view of a coupling device showing first and second coupling members or portions.

Coupling devices are described that may be used to connect a variety of components. By one approach, the coupling device may be suitable to connect a vehicle to a trailer, such as a lawn tractor to a lawn tractor implement, a truck to a boat trailer, or the like, but the coupling devices may be used to couple other items as well. The coupling devices generally include a first coupling portion or first coupling member having a head portion thereof, such as a ball or pin, and a second coupling portion or second coupling member, such as a socket assembly, where the socket has a cup or receiving body forming a pocket therein with an opening at one end thereof for receiving at least a portion of the first coupling member within the pocket. The cup body wall has radially extending bores in communication with the pocket. The bores retain a fastening element, such as detent or ball bearings, which shift within the bores to a locked position at least partially in the pocket to retain the first coupling member within the pocket.

In one aspect, the cup body includes a locking sleeve or locking sleeve assembly mounted thereto that is configured to axially shift toward the opening of the cup body to an unlocked position, which permits the fastening element to retract out of the pocket for insertion or removal of the first coupling member into or out of the pocket. A biasing member or biasing element, such as a coil spring, biases the sleeve away from the cup body opening to a locked position where the sleeve presses against the fastening element so that the fastening element translates in the radial bores to protrude into the pocket of the cup body to lock or retain the ball therein. Because the sleeve moves toward the socket opening to unlock the coupling device, the locking sleeve is also configured to limit exposure of inner portions of the fastening element and the radial bores to the surrounding environment with the locking sleeve in both the locked and unlocked positions. That is, an interior surface of the locking sleeve has a profile that extends axially beyond and covers or engages radially outer portions of the fastening element and outer openings of the radially extending bores in both the locked and unlocked positions of the locking sleeve. Thus, the radially outer portions of the fastening elements and radially extending bores are protected from the surrounding environment by the locking sleeve and, in particular, the inner surface thereof at all times. Such protection limits the ability of debris and contaminants to foul the operation of the coupling device.

In yet another aspect, the locking sleeve assembly and the cup body also have stop surfaces that limit movement of the locking sleeve to the unlocked position where the stop surfaces are arranged so that they are separate from seating surfaces for the biasing member. In one form, the locking sleeve assembly includes a radially extending support surface including one of the surfaces at a radially inward position where the seating surface for the biasing member is at a radially outer portion so that the seat and stop are radially spaced from each other. To this end, the stop surfaces are arranged to engage each other and limit movement of the locking sleeve toward the cup body opening before the biasing member fully compresses or bottoms out.

In another aspect, a locking device may be provided that is mounted to the locking sleeve for blocking unintended shifting of the locking sleeve between its locked and unlocked positions. In one form, the locking device may be a lock or push-type button having a radially inward blocking portion and a radially outward push button. The lock button may be configured to pivot relative to the locking sleeve so that in a first pivot position the radially inward blocking portion is radially positioned to block axial movement of the locking sleeve. Alternatively, when the radially outward push button is pushed, the lock button is configured to pivot to a second, opposite pivot position where the radially inward blocking portion is radially positioned to allow axial sliding of the locking sleeve. Further, the locking device may include a resilient member mounted to the locking sleeve for biasingly pivoting the lock button toward the first pivot position. Pushing the push button counter-biases the resilient member and shifts the blocking portion to the second pivot position. Because the blocking portion of the locking device is configured to move or shift radially, significant axial forces or axial vibration of the coupling device does not affect the positioning of the blocking portion relative to the locking sleeve. Thus, the locking device keeps the head portion of the pin member retained in the cup coupling portion even when the coupling device experiences significant axial loading or vibrations during use. In an alternative embodiment, the locking sleeve may have a retention device or system that is arranged and configured to retain the lock button on the locking sleeve. The retention device is advantageous in the event the resilient member breaks during use of the coupling device to hold the lock button to the lock sleeve.

Turning to more of the details, a first embodiment of a coupling device 10 is illustrated in FIGS. 1-5. In this form, the device 10 includes a first coupling portion or member 12 and a second coupling portion or member 14. In one form, the device 10 includes a ball and socket arrangement.

The first coupling portion 12 has a head portion 18 in the form of a pin or substantially spherical ball 15 that is sized to be received in the second coupling portion 14 along a coupling axis X in the direction of arrow A. The head 18 of the ball 12 tapers, curves, or slopes back toward a collar 17 that forms a transition to an elongate shank 44. In this embodiment, the collar 18 is formed in a unitary manner in one piece with the head portion 18 and shank 44. By one approach, the shank 44 is configured for being mounted to a trailer tongue or vehicle hitch plate. As shown in FIG. 3A, the head portion 18 may also have a flat end 48 that is formed during manufacture of the first coupling member 12 to allow a clearance with a distal end of the pocket 20 when seated therein.

The second coupling portion 14 includes a cup or receiving body 22 having a wall 52, such as an annular wall, forming an inner pocket 20 therein. The pocket 20 is sized to receive the head portion 18. An outer end 25 of the cup body 22 has an inner edge 27, which may include a bevel or chamfer thereon, defining an opening 16 to the pocket 20. The cup body wall 52 includes radially extending bores 26 that extend therethrough to the pocket 20. The bores 26 receive a fastening element 28, such as ball bearings, that function to retain the head portion 18 in the pocket 20. The bores 26 are sized and configured to permit the fastening element 28 to translate radially, while restricting the ball bearings from passing completely into the pocket 20. While the fastening element 28 is shown as a plurality of ball bearings, they can be other elements, sizes, and shapes depending on the application.

The coupling device 10 also includes a locking sleeve or locking sleeve assembly 24 positioned about the cup body wall 32. The locking sleeve 24 is mounted to axially slide or shift along the coupling axis X about the cup body 22 between a locked and unlocked position, which will be described in more detail below. By one approach, the locking sleeve 24 includes an annular wall 29 arranged to slide in an axial direction about an outer surface 31 of the cup body 22.

Figure 3C:
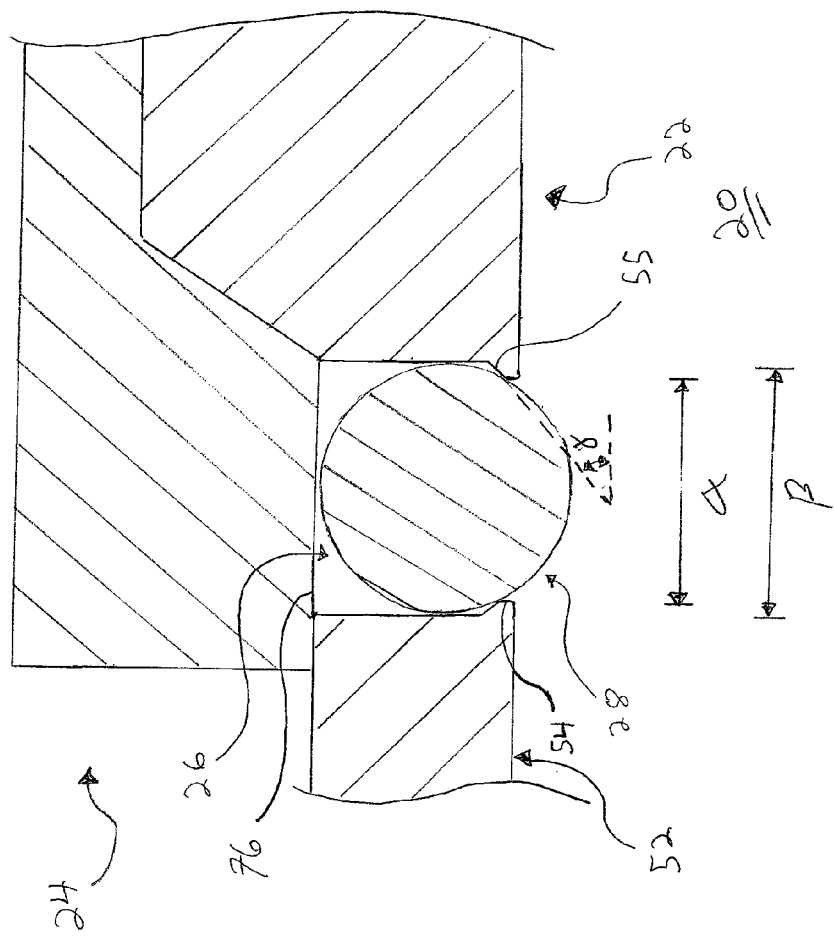
FIG. 3C is a perspective view of a support surface or washer of the coupling device of FIG. 3A.
Figure 4:
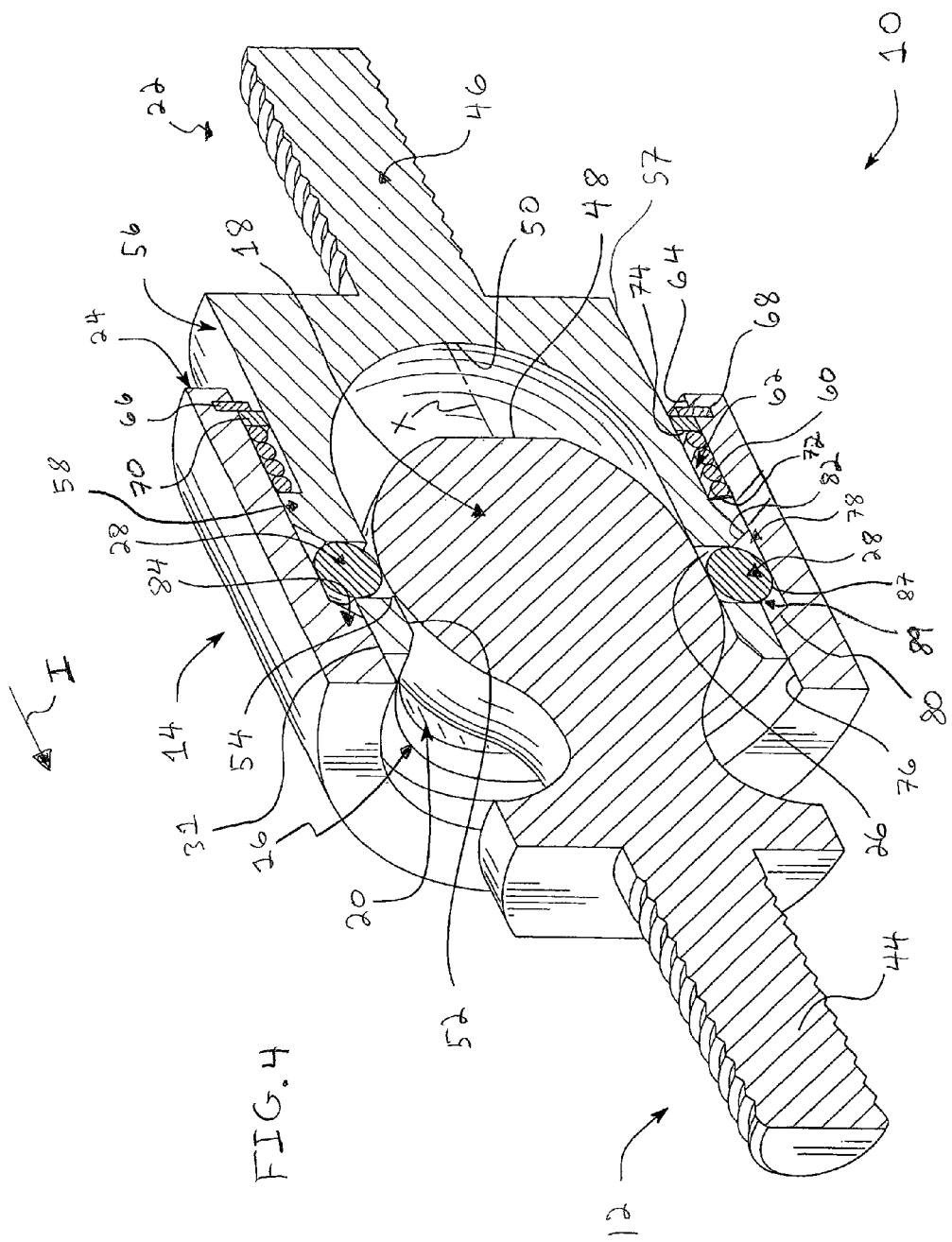
FIG. 4 is a cross-sectional perspective view of the coupling device of FIG. 3A showing the locking sleeve in the unlocked position which permits insertion of the first coupling member into the second coupling member, the first coupling member is shown partially inserted in the second coupling member.

In one embodiment, to permit ingress of the head portion 18 of the first coupling member 12 into the pocket 20 of the second coupling member 14, the locking sleeve 24 is shifted in direction B along the coupling axis X toward the socket opening 16 to an unlocked position (FIG. 4). In this position, the locking sleeve 24 has an inner surface 64 (FIGS. 3A and 4) with a profile thereof configured to permit the fastening element 28 to translate radially outward and out of the pocket 20. The head portion 18 may then be inserted into the pocket 20. Once the head portion 18 is seated within the pocket 20, the locking sleeve 24 is shifted or urged by a biasing member in the opposite direction C along the coupling axis X away from the socket opening 16 to a locked position. With the locking sleeve 24 in the locked position, the inner surface profile also includes a radially enlarged collar 84 having a relatively flat blocking surface 76 (FIG. 3A) that arranged to press the fastening element 28 radially inward within the bores 26 to at least partially project into the pocket 20 so that the fastening element 28 engages the head portion 18 to hold or secure the head portion 18 in the pocket 20.

Whether the locking sleeve 24 is in the unlocked or locked position, at least a portion of the interior surface 64 of the locking sleeve 24 is positioned to extend axially beyond the radially extending bores 26 in the direction of the opening 16 so that the inner surface covers the bores 26 in both the unlocked and locked positions of the sleeve 24. By one approach, the inner surface 64 of the locking sleeve 24 is positioned to slideably engage a portion of the receiving body wall that extends axially between the bores 26 and the opening 16 when the sleeve is both in the locked and unlocked positions. In this way, the locking sleeve 24 is arranged to limit the exposure of the fastening element 28 and bores 26 to the surrounding environment in both the locked and unlocked positions, which limits fouling thereof.

Figure 2A:
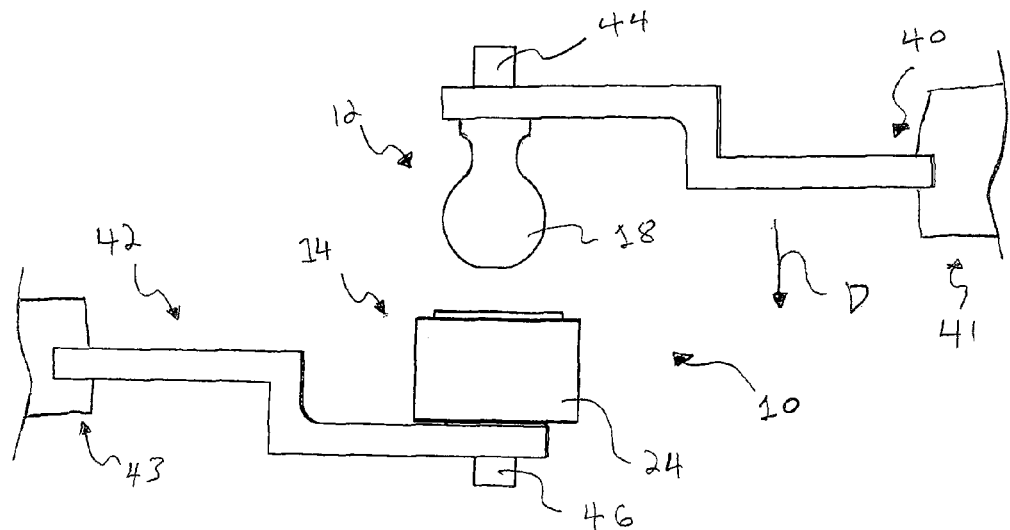
FIGS. 2A-2C are side elevational views of the coupling device of FIG. 1 which show the first coupling member connected to a trailer tongue and the second coupling member connected to a hitch plate with the coupling members in various stages of connection.
Figure 2B:
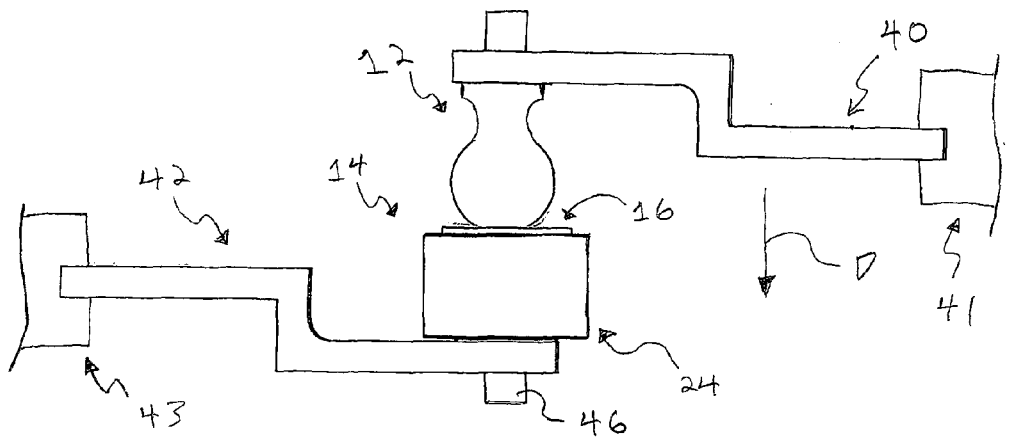
Figure 2C:
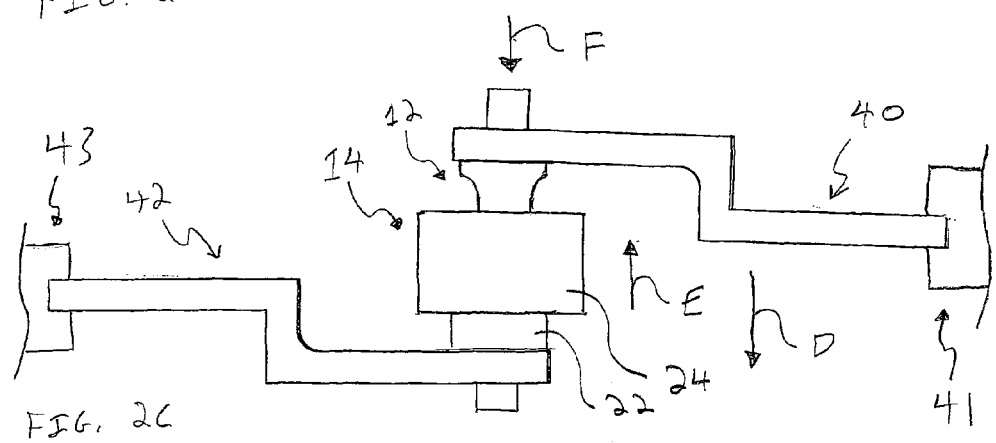

By one approach, the coupling device 10 is particularly well suited to connect a trailer tongue 40 to a hitch plate 42 of a vehicle 43, as shown in FIGS. 2A-2C, where the second coupling member 14 is preferably mounted to the vehicle 43 and the first coupling member 12 is mounted to the tongue 40 on a trailer 41. To this end, the shank 44 of the first coupling member 12 can be connected to the trailer tongue 40, such as by threading, with the head portion 18 pointing downward along a hitching axis H. The second coupling member 14 has a shank 46 that can be connected to the vehicle 43 via the hitch plate 42, such as by threading, with the pocket 20 facing upwardly along the hitching axis in a position to receive the head portion 18. To connect the trailer tongue 40 to the hitch plate 42, the trailer tongue 40 is lifted upwardly and positioned so that the first coupling member 12 is aligned with the second coupling member 14 along the hitching axis H, as shown in FIG. 2A. The head potion 18 is then inserted downwardly into the opening 16 of the second coupling member 14. Preferably, the weight of the trailer 41 acts on the trailer tongue 40 in direction D, which tends to drive the head portion 18 into the pocket 16. As shown in FIG. 2B, the sleeve 24 may be initially in the down or locked position such that ingress of the first coupling member 12 into the second coupling member 14 is restricted because the fastening element 28 protrudes into the pocket 20 to block access of the head portion 18 therein. As shown in FIG. 2C, the head portion 18 is seated within the pocket 20 by first lifting sleeve 24 upwardly along the hitching axis and toward the opening 16 of the pocket 20 in direction E to the unlocked position. This permits the fastening element 28 to shift radially outward within bores 26, as will be described in more detail below, and allows the weight of the trailer 41 to seat the head portion 18 downwardly into the pocket 20 in direction F. Further, shifting the sleeve 24 to the unlocked position tends to pull the second coupling member 14 and hitch plate 42 upward toward the head portion 18 and into connection therewith.

Further details of the coupling device 10 are illustrated in FIGS. 3A-5. As shown in FIG. 3A, the coupling device 10 is shown with the first coupling portion 12 removed from the second coupling portion 14 and the locking sleeve 24 in the locked or biased position. To couple the portions 12 and 14 together, the sleeve 24 is shifted axially toward the pocket opening 20 and the flat end 48 of the head portion 18 is inserted through the cup body opening 16 and positioned in the pocket 20 to seat the first coupling portion 12 in the second coupling portion 14 against a spherical inner surface 50 of the cup body 22. The pocket 20 is sized to permit the head portion 18 to pivot and rotate within the pocket 20 about the axis X.

The cup body 22 includes the cylindrical wall 52 extending about the cup body opening 16 and forming sides of the pocket 20. The inner surface 50 of the wall 52 forms the pocket 20 and preferably has generally flat sides extending along the axis X and a spherical contour at the distal end of the pocket 20 to generally conform to the preferred spherical outer surface of the head portion 18. The wall 52 of the cup body 22 has the radially extending bores 26 therethrough in communication with pocket 20. As shown, the wall 52 has six bores 26; however, additional or fewer bores 26 may also be provided as needed for a particular application.

To retain a fastening element 28 within one of the bores 26, the cup body 22 may have an inner opening 54 on the inner surface 50 of the pocket 20 with a reduced diameter portion 54 of the bore 26, as shown in FIG. 3B. The reduced diameter portion 54 has a smaller diameter, represented by the dimension a, than the diameter of the rest of bore 26, represented by β, which restricts the fastening element 28 from passing completely into the pocket 20. By one approach, the reduced diameter portion 54 is approximately 0.3 inches in diameter whereas the bore 26 is approximately 0.31 to 0.32 inches in diameter; however, these dimensions are only but one suitable example. The cup body 22 may also define a seat 55 that transitions between the diameters α and β with a slope γ, which may be about 45°. The seat 55 restrains the fastening element 28 against passing into the pocket 20 when the sleeve 24 is in the locked position and the sleeve 24 presses the fastening element 28 radially inward.

Returning to FIG. 3A, the wall 52 of the cup body 22 includes an outer surface 56 having a lower cylindrical portion 57 and a radially enlarged annular collar portion 58. The collar portion 58 extends around the cup body 22 and includes an inclined surface 82 that is positioned to act as a stop for the sleeve 24 when the sleeve 24 returns to the locked position, as shown in FIGS. 3A and 3B, and will be discussed in more detail below. By one approach, the first coupling member 12, cup body 22, and sleeve 24 may be made of heat-treated steel that is zinc plated to resist rust, though other materials and manufacturing methods may be used.

The second coupling member 14 also includes a biasing member or element 60, which in one form is a coil spring having a number of coaxial coils, positioned to extend about the cup body 22, such as between the cup body 22 and the sleeve 24 in a continuous, axially extending recess 62 formed in the inner surface 64 of the locking sleeve 24. The recess 62 forms a gap between the lower cylindrical portion 57 of the cup body outer surface 56 and an inner surface 64 of the locking sleeve 24 to receive the coil spring. The biasing member 60 biases or urges the sleeve 24 away from the pocket opening 16 toward the locked position and provides a biasing force that the sleeve 24 needs to overcome in order to be shifted toward the unlocked position.

To maintain the biasing member 60 within the gap 62, a support surface 70 and snap ring 66 are provided to seat the biasing member 60. The support surface 70 is held in place because the snap ring 66 is positioned within a groove 68 formed in the inner surface 64 of the sleeve 24. The snap ring 66 has a coiled configuration that permits the snap ring 66 to radially constrict and fit into the gap 62. The snap ring 66 also has elastic properties which tend to radially expand the snap ring 66 and fix the snap ring 66 within the groove 68. The snap ring 66 retains the support surface 70, shown as a ring washer, against the expansive force of the biasing member 60. As shown in FIG. 3C, the preferred washer 70 has an opening 67 sized to receive the lower cylindrical portion 57 of the cup body surface 56 slideably therein and is arranged on the sleeve 24 so that a radial inner surface 69 of the washer 70 is spaced from the surface 56 sufficiently so that the sleeve 24 may shift between the locked and the unlocked positions.

To assemble the second coupling member 14 of FIG. 3A, the fastening element 28 is first positioned within the radially extending bores 26 of the cup body 22. The sleeve 24 is then slid over the cup body 22 in direction G to trap the fastening element 28 between the sleeve inner surface 64 and the bore reduced diameter portions 54. Next, the biasing member 60 is passed between the sleeve inner surface 64 and the cup body outer surface 56 in direction H into the gap 62. The leading end or one of the first coils of the biasing member 60 eventually contacts an upper spring seat 72 of the cup body 22. The spring seat 72 may be in the form of a radially projecting ledge formed on the underside of the radially extending collar portion 58.

The ring washer 70 is then axially inserted into the gap 62 in direction H to engage the other end or the last of the coils, which compresses the biasing member 60. A portion of the washer 70 provides a lower spring seat 74 on a radially inner portion of the ring washer 70. The snap ring 66 is inserted between sleeve inner surface 64 and the cup body outer surface 56 in direction H until it reaches groove 68. Once there, the elastic properties of the snap ring 66 allow it to radially expand into the groove 68, which restricts the ring washer 70 from shifting in direction G due to forces exerted by the biasing member 60. The expansive force of the biasing member 60 biases the sleeve 24 to the locked position where the inclined mating surface 82 on the cup wall 52 contacts or engages a corresponding inclined mating surface on the inner surface 64 of the sleeve 24 to position the blocking surface portion 76 of the sleeve inner surface 64 aligned with the radially extending bores 26. In this position, the blocking surface 76 presses the fastening element 28 radially inward into the pocket 20. In the illustrated embodiment of FIG. 3A, the biasing member 60 has a coiled, axial length that is longer than the distance between the spring seats 72, 74. This way, the biasing member 60 presses the ring washer 70 tightly against the snap ring 66 even when the sleeve 24 is in the locked position and maintains the second coupling member 14 in the assembled configuration.

Turning to FIG. 4, the assembled coupling device 10 is shown with the sleeve 24 shifted to the unlocked position in direction I toward the opening 16 of the cup body 22. Shifting the sleeve 24 to the unlocked position draws upper and lower spring seats 72, 74 together and compresses the biasing member 60. Shifting the sleeve 24 to the unlocked position also aligns the radially extending bores 26 with a portion of the axially extending recess 62 and gap 78 thereof formed between the inner surface 64 of the sleeve 24 and the outer surface portion 31 of the cup wall 52. The recess 62 permits the fastening element 28 to translate radially outward to be received in the gap 78 such that the head portion 18 may be inserted into the pocket 20. Further, the spherical profile of the head portion 18 tends to cam the fastening element 28 radially outward as the head portion 18 is inserted into the pocket 20.

The device 10 also permits the spring 60 and the fastening element 28 to be received in the same recess 62 formed by the lower recessed portion of the sleeve 24. Prior coupling devices included separates sleeve or ring pockets for the spring and locking balls. To this end, the device 10 also includes the radially enlarged collar portion 58 of the receiving body wall arranged to divide the recess 62 into a first recess portion 79 for receiving the biasing member 60 therein and a second recess portion 81 into which the portion of the fastening element 28 is received in the unlocked position thereof as shown in FIG. 4. That is, the collar 58 extends radially into the gap 78 formed by the locking collar recess 62 to axially divide the recess 62 into the respective portions 79 and 80 when the locking sleeve is shifted to the unlocked position.

With the fastening element 28 in a radially expanded position, a portion of the fastening element 28 is positioned in the gap 78 formed between the opposed inclined surfaces 80, 82 of the sleeve 24 and the cup body 22, respectively. The inclined surface 80 of the sleeve 24 is formed on the radially enlarged collar portion 84 of the sleeve 24, which transitions radially inward from the blocking surface 76. Conversely, the inclined surface 82 of the cup body 22 is formed on the cup collar portion 58, which transitions radially outward from the cup body 22. In the illustrated embodiment of FIG. 4, the inclined surfaces 80, 82 are generally annular about the pocket 20 and have complimentary slopes which permit the sleeve collar 84 to seat snugly against the cup collar 58 when the sleeve 24 is in the locked position. By one approach, the inclined stop surfaces 80, 82 have a slope relative to the longitudinal axis X of about 45°, but other slope angles may also be used.

Figure 5:
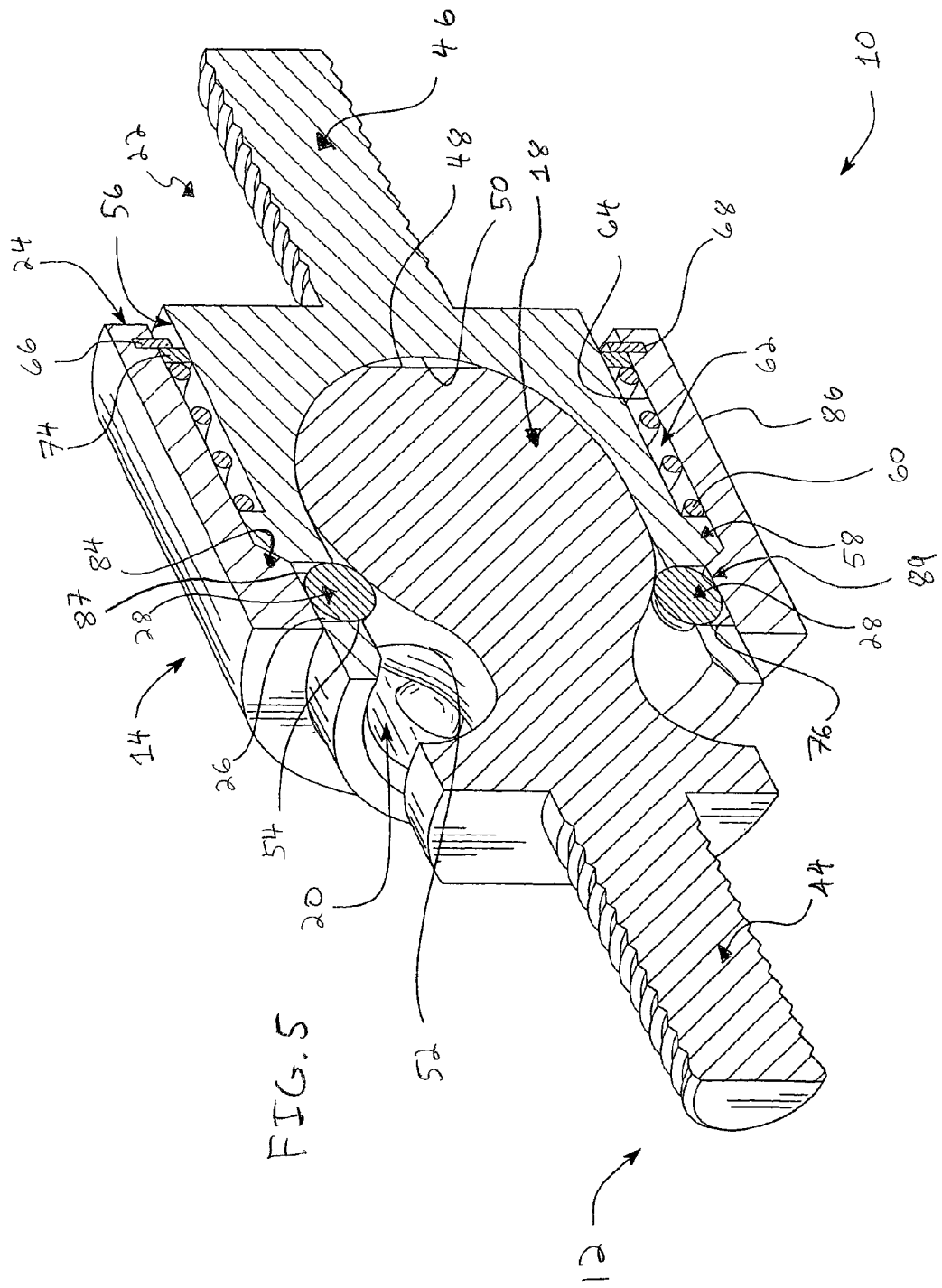
FIG. 5 is a cross-sectional perspective view of the coupling device of FIG. 4 showing the locking sleeve in the locked position which locks a head portion of the first coupling member within the second coupling member.

Once the head portion 18 is seated within pocket 20, the sleeve 24 may be released such that the biasing member 60 returns the sleeve 24 to the locked position, as shown in FIG. 5. The biased return of sleeve 24 draws the opposed inclined surfaces 80, 82 together as the sleeve 24 shifts towards the locked position. The sloped configuration of the inclined surface 80 on the locking sleeve 24 cams or shifts the fastening element 28 radially inward as the opposed surfaces 80, 82 are drawn together. Additionally, the sleeve collar portion 84 and the cup body collar portion 58 form a stop that limits movement of the sleeve 24 to the locked position when the surfaces 80 and 82 engage each other.

As shown in FIGS. 4 and 5, the interior surface 64 of the sleeve 24 extends axially beyond or covers the radially outer surfaces 87 of the fastening element 28 and an outer opening 89 of the bores 26 at the outer surface of the cup wall 52 regardless of the position of sleeve 24 (i.e., locked or unlocked) during use of the coupling device 10. In the locked position (FIG. 5), the blocking surface 76 of the sleeve 24 is aligned with the radially extending bores 26 and provides the coverage. In the unlocked position (FIG. 4), the recess 78 of the sleeve 24 is aligned with the radially extending bores 26 to permit the fastening element 28 to shift radially outward and both the blocking surface 76 and lowered recessed surface of the sleeve provide the coverage.

In one particular embodiment, the locking sleeve 24 has an inner surface portion thereof that is positioned to extend axially beyond the radially extending bore 26 of the receiving body wall 52 and toward the receiving body opening 16 in both the locked and unlocked positions of the locking sleeve 24. In this approach, the locking sleeve 24 may also have an inner surface portion positioned to slideably contact or engage a portion of the receiving body wall 52 that extends axially between the radially extending bore 26 and the opening 16 of the body 52. Covering the radially outer surfaces 87 of the fastening element 28 and the outer openings 89 of the bores 26 in this manner and at all times by the locking sleeve 24 limits the amount of debris that may accumulate and foul operation of the fastening element 28. Furthermore, the collar portion 84 of the sleeve 24 is coaxially disposed (extends radially) on the cup body cylindrical wall 52 adjacent the opening 16, which allows the sleeve to restrict debris from the surrounding environment from passing into contact with the fastening element 28. The collar portion 84 of the sleeve 24 also may scrape any potential debris deposited on the cup body cylindrical wall 52 away from the fastening element 28 when the sleeve 24 is shifted to the unlocked position. Moreover, the sleeve inclined surfaces 80, 82 and the spring stops 70, 72 function together to retain the fastening element 28 within the bores 26 no matter what position the lock sleeve is moved to. That is, because the inner portions 89 of the fastening element 28 is preferably never exposed to the environment, there is little chance the fastening element 28 can fall out of the device 10.

The spherical inner surface 50 of the pocket 20 preferably has a complimentary curvature or shape as that of the head portion 18 as shown in FIG. 5. The similar curvatures or shapes allow the head portion 18 to pivot and/or rotate as in the pocket 20. With the sleeve 24 in the locked position, the fastening element 28 projects radially inward to the pocket 20 to resist back out of the head portion 18 from the pocket 20. Further, the fastening element 28 is free to rotate within the bores 26 such that there is limited resistance of the fastening element 28 to rotation of the head portion 18. With this configuration of the device 10, the coupling has been tested to withstand up to about 12,600 lbs of pull force; however, this may vary based on a number of factors.

An additional embodiment of the coupling device 110 is shown in FIGS. 6 through 10A and 10B. The coupling device 110 is similar in a number of ways to coupling device 10, including a first coupling member or first coupling portion 112, such as a ball or pin, and a second coupling portion or member 114, such as a socket, that are similar to the first coupling member 12 and the second coupling member 14. The second coupling member 114 has an opening 116 at one end which receives a head portion 118 of the first coupling member 112. Once received, the head portion 118 is seated within a pocket 120 formed by a cup or receiving body 122 of the second coupling member 114. A locking sleeve or locking sleeve assembly 124 is slideably disposed on the cup body 122 and capable of being shifted or slid in an axial direction to an unlocked position in the direction J (FIG. 6) toward the cup body opening 116. The cup body 122 also has radially extending bores 126 that receive a fastening element 128, such as ball bearings, detent balls, cylinders, and the like. In a manner similar to the coupling device 10, shifting the locking sleeve assembly 124 in an axial direction toward the opening 116 to the unlocked position permits the fastening element 128 to shift radially outward and allows insertion of the head portion 118 into the pocket 120. The second coupling member 114 also includes a shank 130 that may be configured to be connected to a tongue of a trailer or a hitch plate of a vehicle or other object. The shank 130 may be threaded or unthreaded and may include a hex end 132 sized to be turned with a wrench during installation of the second coupling member 114.

In this embodiment, the first coupling member 112 is a two-piece assembly including a main body 135 and separate collar 138. The main body 135 includes the head portion 118 and a shank 134. By one approach, the head portion 118 is preferably a spherical ball or pin, which allows for pivoting of the first coupling member 112 when received in the second coupling member 114. The shank 134 extends from the head portion 118 and may be threaded or unthreaded and may be configured to be connected to the other of the trailer tongue and the hitch plate of the vehicle or other object. The shank 134 may also have a hex end 136 sized to be turned with a wrench during installation of the first coupling member 112. The collar 138 includes an annular body 137 having a central opening 140 through which the shank 134 extends. The first coupling member 112 is assembled by sliding the collar 138 along the shank 134 and into abutting relation with an enlarged cylindrical portion 142 of the shank 134. When the shank 134 is threaded into or otherwise connected to the trailer tongue or hitch plate, the collar 138 is trapped between the trailer tongue or hitch plate and the enlarged cylindrical portion 142. Utilizing a two-piece first coupling member 112 reduces the cost of manufacture and permits different collars 138 to be utilized.

The second coupling member 114 is a multi-component assembly including a cup or receiving body 122 forming the pocket 120 therein for receipt of the head portion 118 and the locking sleeve assembly 124 with a biasing member 170 for urging the locking sleeve 124 axially away from the cup body opening 116 to a locked position. As with the previous embodiment, the locking sleeve assembly is slideably mounted to the cup body 122 and arranged to slide axially toward the opening 116 to shift the second coupling member 114 to the unlocked position.

Figure 6:
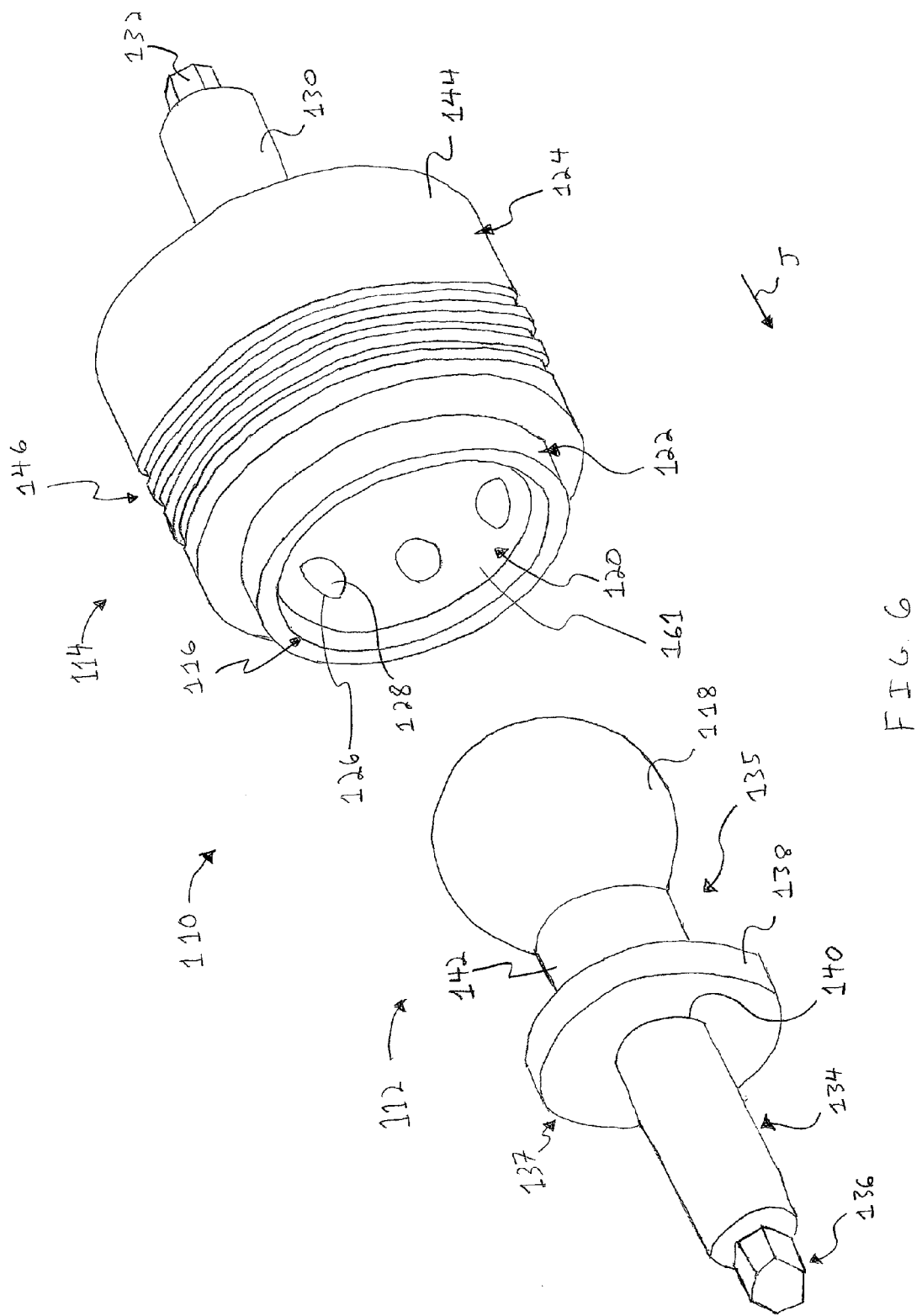
FIG. 6 is a perspective view of another embodiment of the coupling device in accordance with the present invention which includes first and second coupling members.
Figure 7:
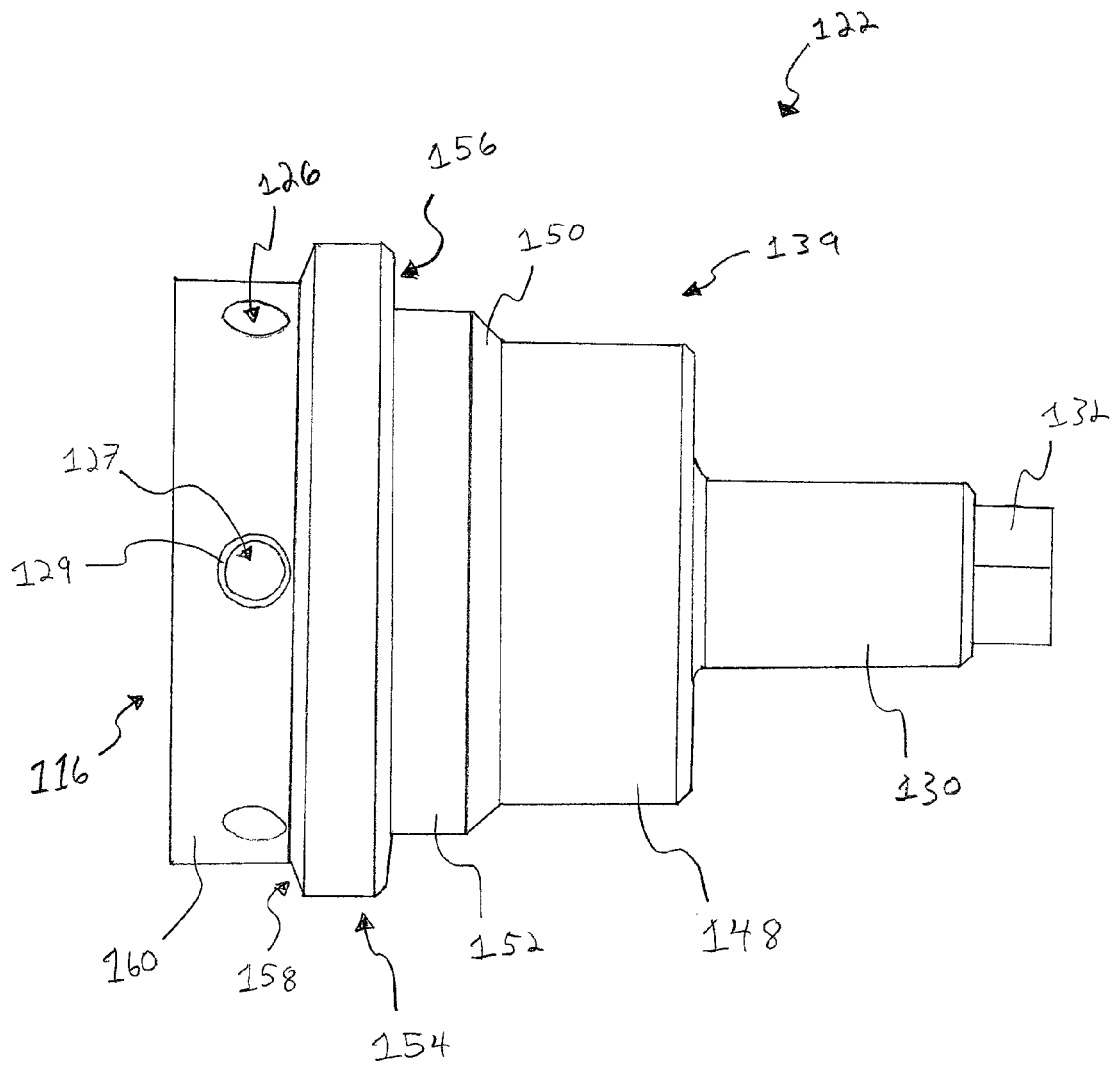
FIG. 7 is a side elevational view of a cup body of the second coupling member of FIG. 6 showing the outer profile of the cup body.

More particularly, and referring to FIG. 7, the cup body 122 has a cylindrical wall 160 extending about the cup body opening 116 and forming the side walls of the pocket 120. An inner surface 161 of the wall 160, as shown in FIG. 6, forms the pocket 120 and may have a contour (such as a tapered, curved, or spherical profile) at a distal or inner end of the pocket 120 to conform to a contour of the outer surface of the head portion 118. The wall 160 of the cup body also has the radially extending bores 126 therethrough in communication with the pocket 120. By one approach, the wall has six bores; however, additional or fewer bores may be provided as needed for a particular application. Like the cup body 22, the wall 160 of the cup body 122 also defines reduced diameter portions 127 of the bores 126 which restrict the fastening element 128 from passing completely into the pocket 120.

The cup body 122 may also define a seat 129 for each of the fastening elements 128 similar to those illustrated in FIG. 3B.

Figure 8A:
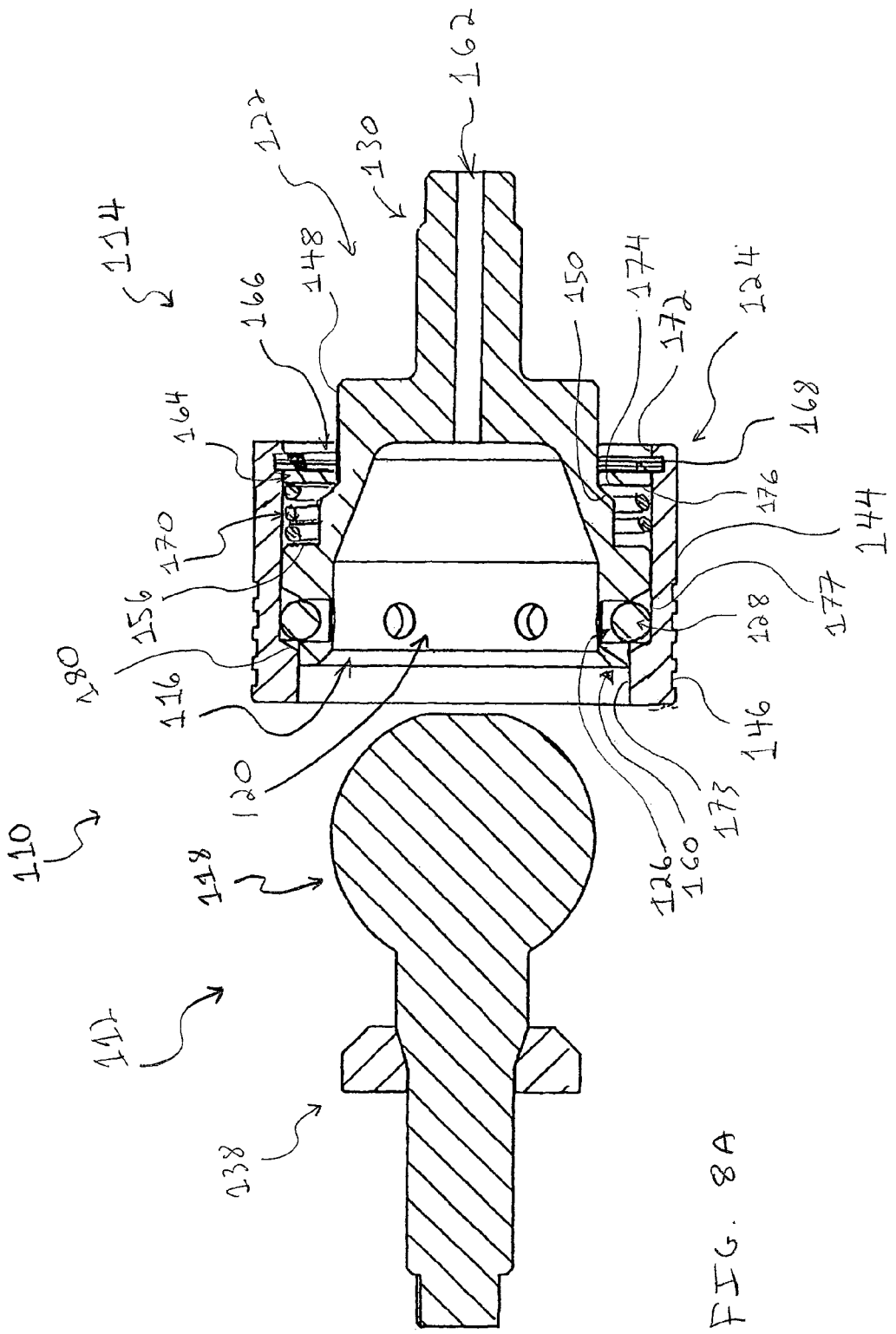
FIGS. 8A-8C are cross-section side elevational views of the coupling device of FIG. 6 showing the movement of internal components of the second coupling member as a sleeve thereof shifts between unlocked and locked positions.

Turning briefly to FIG. 8A, the cup body 122 may also include an optional drainage bore 162 extending longitudinally through the cup body 122 along the axis X. By one approach, the drainage bore 162 extends longitudinally through the cup shank 130 and communicates with the pocket 120, such as the distal end thereof. That is, the bore 162 has a first or entrance opening 163 at the inner or distal end of the pocket 120 and a second or exit opening 165 at the other end of the shank 130. With the second coupling member 114 facing upwardly from the trailer tongue or the hitch plate of a powered vehicle, the second coupling member 114 may collect fluids such as rainwater, which is able to flow out of the socket 114 via the drainage bore 162.

Returning to FIG. 7, the outer profile of the cup body 122 is shown in more detail. By one approach, the cup body 122 has a lower or reduced diameter outer surface portion 148 joined to the shank 130. Transitioning radially away from the other side of the surface portion 148 is an inclined stop surface 150. The stop surface 150 inclines outwardly or radially extends away from the surface 148 heading toward the cup body opening 116. The sloped or inclined configuration of the stop surface 150 provides a gradual increase in the size of cup body 122 to an intermediate, outer surface portion 152. The cup body 122 also has a collar 154 that provides on an underside thereof an annular ledge or spring seat 156, which extends circumferentially about the cup body 122 and faces away from the cup body opening 116. The collar 154 also has an inclined or surface 158 on the upper side, which faces toward the cup body opening 116 and acts to limit movement of the sleeve 124 toward the locked position in a manner similar to the stop surface 82 of coupling device 10, as will be discussed in more detail below.

Figure 8B:
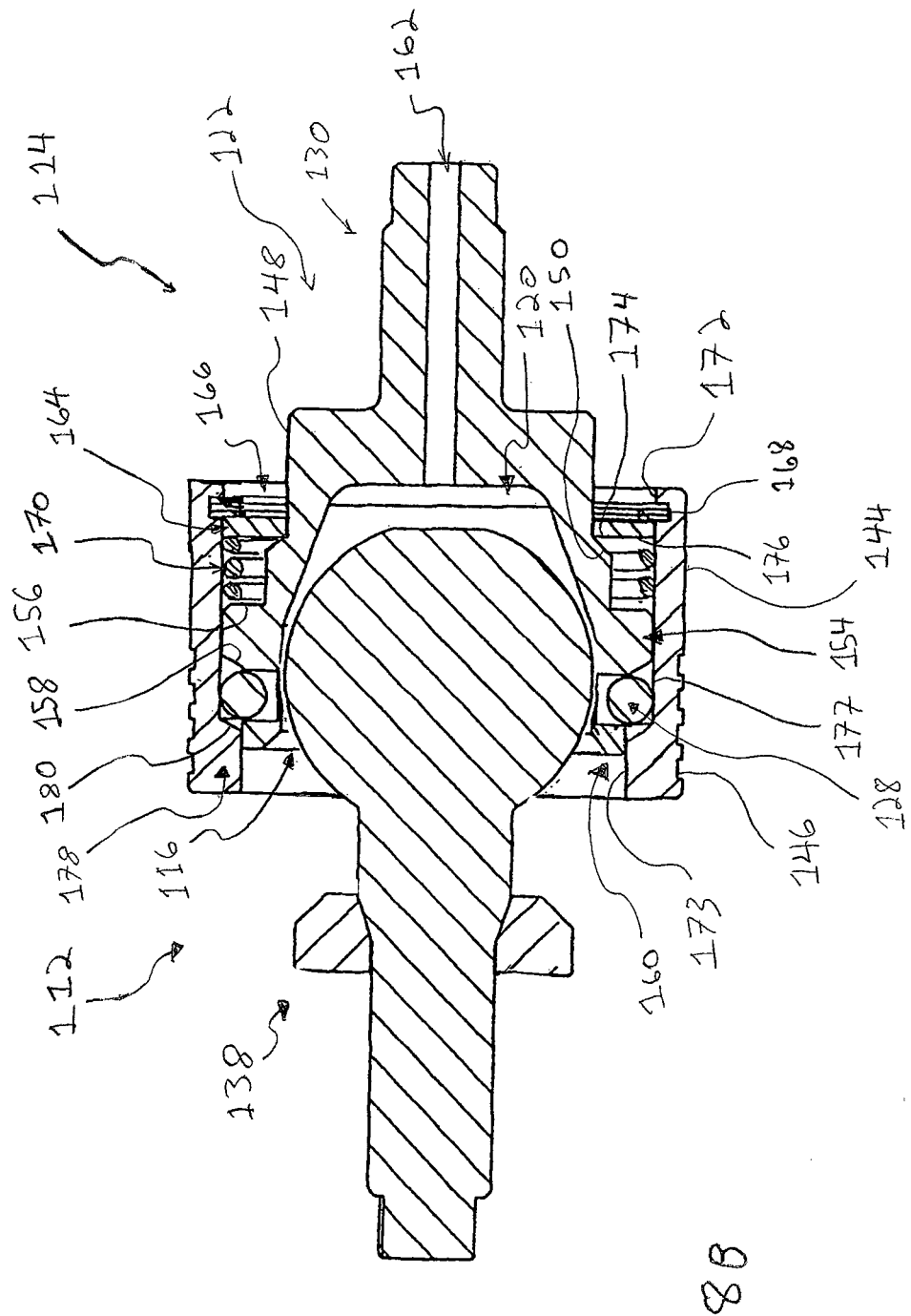
Figure 8C:
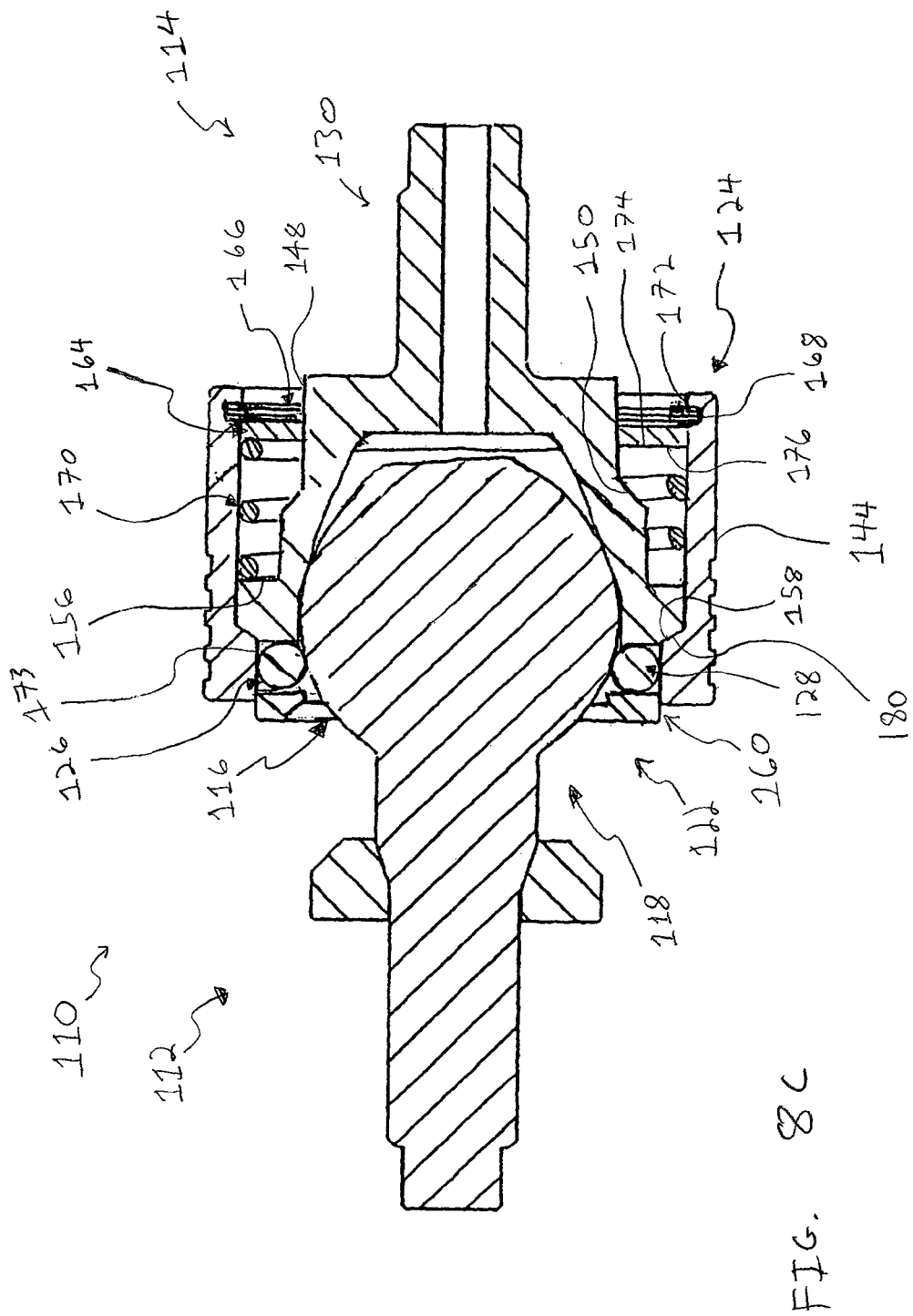

FIGS. 8A-8C show a series of cross-sectional views of the coupling device 110 with the first coupling member 112 being inserted into the second coupling member 114 and connected thereto, with the locking sleeve assembly 124 shifted between locked and unlocked configurations. To this end, the locking sleeve assembly 124 has an inner surface 172 with a profile thereof that includes a radially enlarged collar 178 with a blocking surface 173, a transition or stop surface 180, and a lower, radially recessed surface 177. These portions of the locking sleeve assembly 124 will be discussed in more detail below.

FIG. 8A shows the locking sleeve assembly 124 in the unlocked position, where the locking sleeve assembly 124 is shifted axially toward the opening 116 of the cup body 122. In this configuration, the locking sleeve assembly 24 is shifted so that the lower radially recessed surface 177 is aligned with the bores 126 formed in the cup body 122, which permits the fastening element 128 to shift radially outward so that the head portion 118 may enter the pocket 120 (FIG. 8B). As shown in FIG. 8A, the individual members of the fastening element 28 are received in a gap or space between the cup wall 160 and the lower recessed surface 177 when in the locked position. Shifting the locking collar assembly 124 away from the cup body opening 116 to the locked position aligns the sleeve blocking surface 173 with the bores 126, which urges or shifts the fastening element 128 radially inward to secure the head portion 118 within the pocket 120, as shown in FIG. 8C.

As with the other embodiment, a biasing element 170 preferably urges the locking sleeve assembly 124 to the locked position. Also similar to the previous embodiment, regardless of the position of the locking sleeve 124 (i.e., locked, unlocked, or therebetween), the bores 126 and the fastening element 128 are protected or covered by the sleeve assembly inner surface 172. That is, for example, the locking sleeve assembly 124 has a portion of its radially enlarged collar 178 or blocking surface 173 arranged to extend axially beyond the radially extending bores 126 toward the opening 116 in both the locked and unlocked configuration of the device. In one preferred approach, the sleeve assembly 124 includes a portion of the radially enlarged blocking surface 173 positioned to engage or contact the wall 160 that extends axially between the radially extending bores 126 and the opening 116. This arrangement limits the amount of dirt, debris, or other contaminates that may accumulate and foul operation of the fastening element 128 because the sleeve walls blocks the dirt or debris from entering the spaces between the cup body 160 and sleeve 124. Further, the sleeve collar 178 may be tightly toleranced relative to the cup body cylindrical wall 160 to restrict debris from entering and becoming wedged between the locking sleeve 124 and the cup body 122.

Returning to FIG. 8A, the locking sleeve assembly 124 includes a support surface assembly 164, which may include a ring washer, connected to and extending radially inward from a distal or lower end 144 of the sleeve assembly 124. In a manner similar to the ring washer 70 of the coupling device 10, the assembly 164 is held in place by a snap ring 166 positioned within a groove 168 on the inner surface of the sleeve 124. The snap ring 166 fixes the washer 164 against an expansive force from a biasing member 170, which is received in a gap between the outer cylindrical surface 152 of the cup body 122 and the lower recessed surface 177 of the sleeve inner surface 172. The assembly 164 includes a portion that extends radially inward a greater amount than the washer 70 of coupling device 10. Specifically, the assembly 164 has an opening sized to receive the cylindrical outer surface 148 of the cup body 122 such that the assembly 164 may travel along the cylindrical outer surface 148 as the sleeve 124 shifts between locked and unlocked positions.

Briefly turning to FIG. 9, the support surface assembly 164 includes a ring washer that forms a radially extending support surface, which also includes a stop surface portion formed by a radially inner stop 174, which is arranged to contact or strike the stop surface 150 of the cup body 122 to restrict movement of the sleeve 124 toward the cup body opening 116 and preferably before the biasing member is fully compressed. The washer support surface also has a radially outer spring seat portion 176 that is arranged in opposing relation to the annular spring seat 156 of the cup body 122 when the second coupling member 114 is assembled. In this manner, the assembly 164 has the radially inner stop portion 174 that is separate from the radially outer spring seat 176 by a radial distance R. The radially inner stop portion 174 of washer 164 can therefore be used to limit movement of the sleeve 124 toward the unlocked position without relying upon bottoming out of the biasing member 170. That is, if the biasing member 170 is a coil spring with a series of aligned coils 171 for biasing the locking sleeve assembly, the stop surface 174 is arranged to engage the stop surface 156 so that when engaged the coils of the coil spring are not fully compressed.

Returning to FIG. 8B, the sleeve assembly 124 is shown in the unlocked position with the head portion 118 being seated within the pocket 120 of the cup body 122. FIG. 8B also shows that the sleeve 124 has the radially enlarged collar 178 that includes a stop surface when engaged with the enlarged collar 154 of the cup body 122. For example, the collar 178 includes the included surface 180 that is in opposed relation to the inclined surface 158 of the cup body collar 154. The collar 178 and the collar 154 interact in a manner similar to the collar 58 and the collar 84 of the coupling device 10. Specifically, the stop surfaces 158, 180 are pressed together when the sleeve 124 is in the locked position and spaced apart when the sleeve 124 is in the unlocked position. In this manner, the biased return of the sleeve assembly 124 from the unlocked to the locked position by the coil spring 170 is restricted by the sleeve collar 178 contacting the cup body collar 154. This limits the biasing member 170 to a predetermined range of motion. Additionally, the inclination of the stop surface 180 of the sleeve assembly 124 acts to cam the fastening element 128 radially inward as inclined surface 180 engages the inner edge of the fastening element 128.

As shown in FIGS. 8A to 8C, the lower recessed surface 177 of the locking sleeve assembly 124 forms a gap or pocket between the sleeve assembly 124 and the cup body 160. The device 110 is unique in that both the biasing member 170 and the fastening element 124 (in the unlocked positions) are arranged to be received within the same gap formed below the sleeve collar 178 between the sleeve surface 177 and the cup body wall 160. This is in contrast to prior coupling devices that utilize separate pockets for the ball bearings and coil springs.

With the head portion 118 seated within the pocket 120, the head portion 118 may pivotably rotate within the pocket 120. The radially extending bores 126 in the cup body wall 160 are positioned such that the fastening element 128 contacts the head portion 118 spaced a distance D from an equator EQ of the head portion 118 (FIG. 8C). Positioning the fastening element 128 to contact the head portion 118 spaced from the equator increases the range of motion of the first coupling member 112 relative to the second coupling member 114.

Figure 10B:
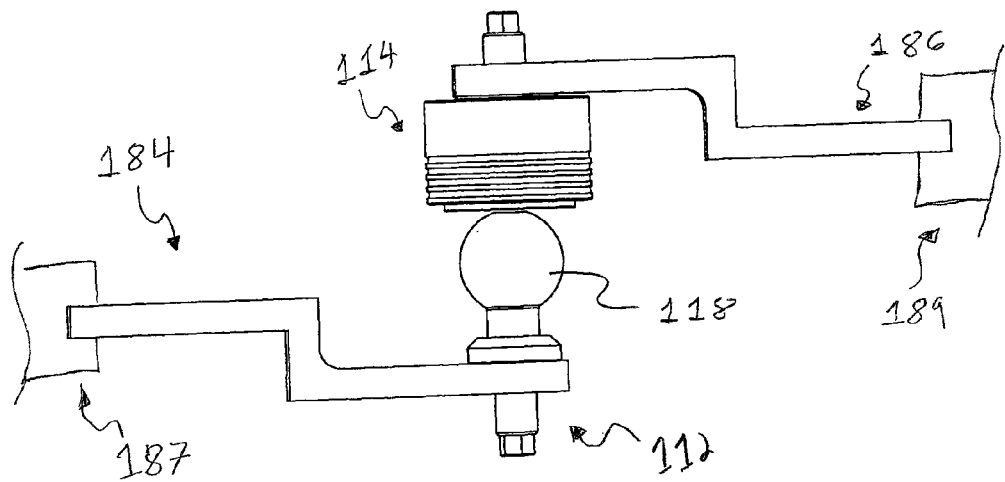
FIG. 10B is a side elevational view of the coupling device of FIG. 6 showing the second coupling member connected to a trailer tongue and facing downward toward the first coupling member which is connected to the hitch plate.
Figure 10A:
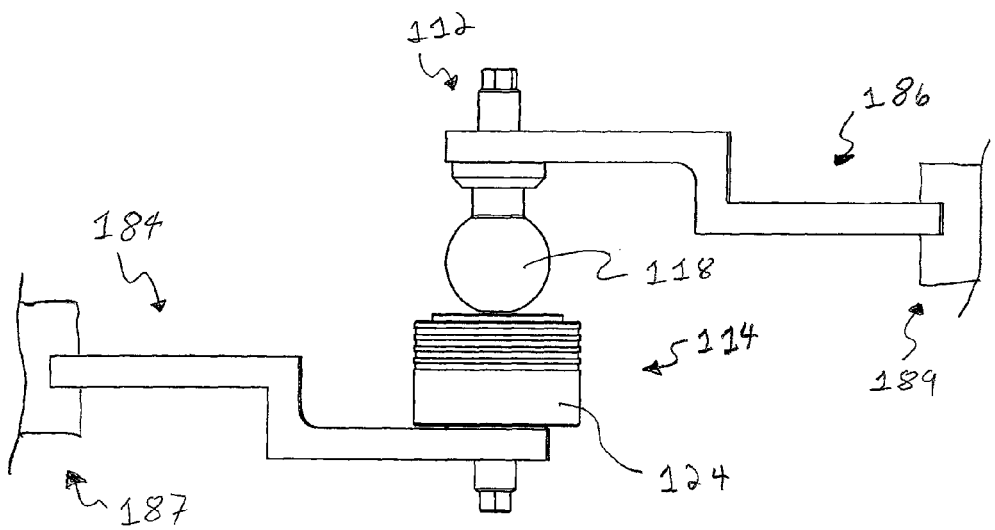
FIG. 10A is a side elevational view of the coupling device of FIG. 6 showing the second coupling member connected to a hitch plate of a vehicle and facing upward toward the first coupling member which is connected to a trailer tongue.

Turning to FIGS. 10A and 10B, examples of the device 110 mounted to a vehicle 187 and trailer 189 are illustrated. In a preferred orientation, the coupling device 110 is arranged so that the second coupling member 114 is facing upward where the shank 130 is extending below and connected with a hitch plate 184 of the vehicle 187, as shown in FIG. 10A. In this approach, the first coupling member 112 is preferably connected to a tongue 186 of the trailer 189 with the head portion 118 facing downward toward the upwardly facing second coupling member 114. However, the coupling device 110 is also well suited for configurations where the second coupling member 114 is connected to the trailer tongue 186 and faces downwardly toward the upwardly projecting first coupling member 112, as shown in FIG. 10B. Returning to FIG. 10A, when the sleeve assembly 124 is shifted upwardly, the radially inner stop portion 174 of the washer 164 strikes the stop surface 150 of the cup body 122. Once the stop portions are engaged, continuing to pull upward on the sleeve 124 may also lift the cup body 122 and attached hitch plate 184 upward towards the head portion 118. This movement tends to draw the pocket 120 onto the head portion 118 and aids in connecting the second coupling member 114 to the first coupling member 112. This is particularly advantageous because the motion of unlocking the sleeve assembly 124 is in the same direction as the coupling motion to join the first and second coupling members.

Another aspect of the coupling devices 10, 110 is that by having the sleeves 24, 124 shift toward the cup body openings 16, 116 in order to unlock, there is less of the potential for inadvertent disconnection during use. For example, when the second coupling member 114 is mounted facing upward, the sleeve assembly 124 needs to be shifted upwardly toward the first coupling member 112 before the head portion 118 may be removed from the pocket 120. Thus, positioning the unlocked position of the sleeve 124 toward the cup body opening 116 is advantageous because it is generally difficult for branches, rocks, debris, and the like to inadvertently strike the sleeve 124 and cause it to move in an upwardly manner to disconnect the first coupling member 112 and second coupling member 114.

An additional embodiment of the cup coupling portion or second coupling member 200 is shown in FIGS. 11-19 in which a lock device 201 is provided to block unintended shifting of the locking sleeve. The lock device 201 is configured to move or shift radially as opposed to axial movement of the locking sleeve. As a result, the lock device is generally not affected by axial forces potentially experienced by the coupling device during use.

Figure 11:
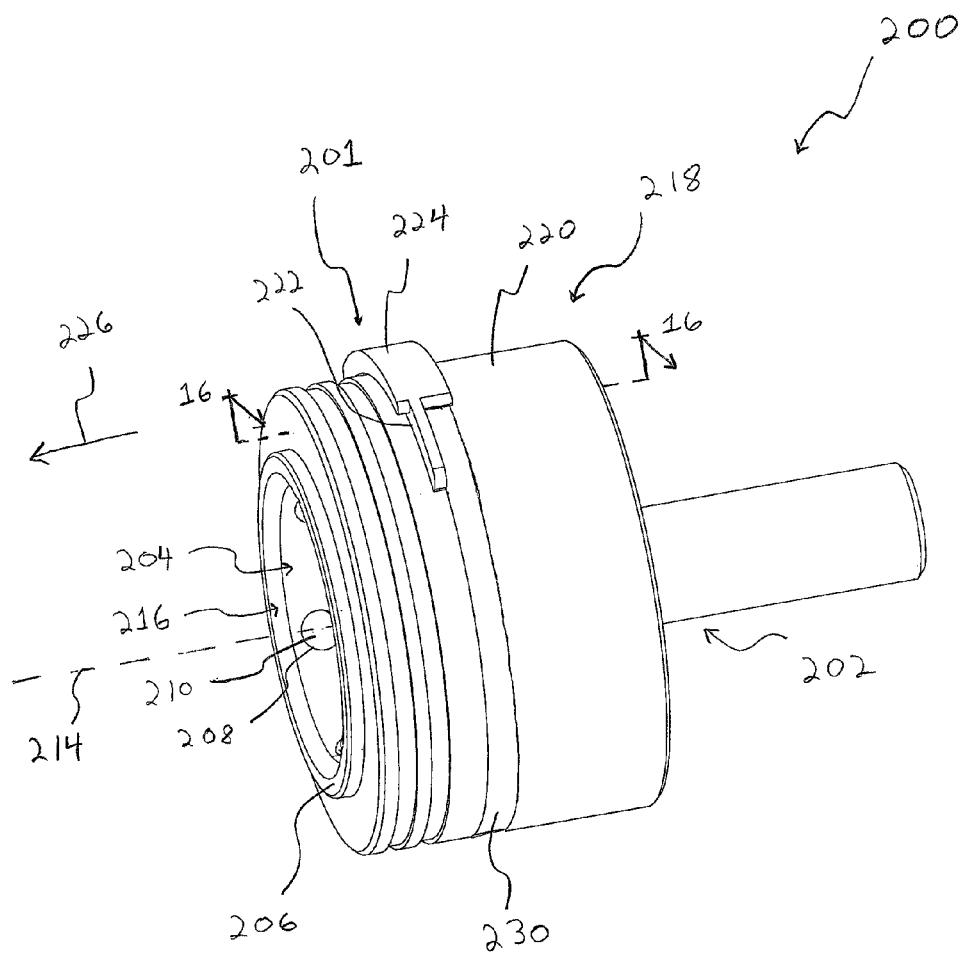
FIG. 11 is a perspective view of a second coupling member showing a lock button mounted on a locking sleeve of the second coupling member.

Preferably, the second coupling member 200 is similar to the previously described coupling members. For example, the second coupling member 200 couples with a pin coupling member such as the pin or first coupling member 112. The second coupling member 200 includes a cup body 202 with a pocket 204 sized to receive a head portion of the first coupling member 112. The second coupling member 200 is similar in a number of ways to the second coupling members 14, 114 discussed above. Specifically, the coupling device 200 includes a wall 206 which defines the pocket 204 and includes a plurality of bores 208 which extend radially outward through the wall 206 and receive fastening elements 210, as shown in FIG. 11. The cup body 202 also includes a central axis 214 and an opening 216 which opens into the pocket 204. Like the second coupling members 14, 114, the second coupling member 200 has a locking sleeve 218 slideably mounted to the cup body 202. The locking sleeve 218 may be shifted along the central axis 214 from an unlocked position, where the head portion 118 can be inserted or removed from the pocket 204, to a locked position for retaining the head portion 118 of the first coupling member 112 in the pocket 204. To limit inadvertent disconnection between the second coupling member 200 and the first coupling member 112, the locking sleeve 218 may have a locking device 201 which selectively engages the cup body 202 in a radial direction to restrict movement of the locking sleeve 218 in an axial direction 226 toward the unlocked position. In the illustrated embodiment, the locking device 201 includes a locking member or rocker button 224 that is received within a slot 222 formed in a wall 220 of the locking sleeve 218.

With temporary reference to FIGS. 16 and 17, the rocker button 224 can be shifted radially inward or outward relative to the locking sleeve 218. The rocker button 224 shifts between a first pivot or interference position (FIG. 16) and a second, opposite pivot or clearance position (FIG. 17). In the interference position of FIG. 16, a blocking portion 228 of the rocker button 224 is positioned to block sliding of the locking sleeve 218 along the cup body 202 in an axial direction 350 beyond a predetermined position. This limits the risk of the locking sleeve 218 inadvertently shifting to the unlocked position when not intended wherein the first coupling member 112 could be removed from the second coupling member 200. In the clearance position of FIG. 17, the blocking portion 228 of the rocker button 224 is shifted radially outward from the interference position and permits the locking sleeve 218 to slide in the axial direction 350.

Returning to FIG. 11, the second coupling member 200 has a resilient or biasing member 230 which biases the rocker button 224 to the interference position. As shown, the biasing member 230 is constructed of a resilient material; however, the member 230 may also be other suitable biasing devices, such as coil springs, flat springs, other resilient material, and the like. To shift the rocker button 224 to the clearance position, a radially outer portion of the rocker button 224 is pressed to counter-bias the biasing member 230 as discussed more fully below with respect to FIGS. 15A-15C. This rocks or pivots the rocker button 224 in a direction that is transverse or radial to the central axis 214 of the cup body 202. Thus, once the locking sleeve 218 is in the locked position and the biasing member 230 is biasing the rocker button 224 into the interference position, the rocker button 224 will generally block movement of the locking sleeve 218 toward the unlocked position until the rocker button 224 is pressed to shift the rocker button 224 to the clearance position. One advantage of this approach is that sudden impacts or vibrations transmitted between a trailer and a vehicle will tend to travel axially along the central axis 214 of the second coupling member 200. These axial loads, however, will not shift the rocker button 224 to the clearance position because they are transverse to the direction of movement of the rocker button 224. Accordingly, the rocker button 224 will remain in the interference position until a user counter-biases the biasing member 230 and shifts the rocker button 224 to the clearance position.

Figure 12:
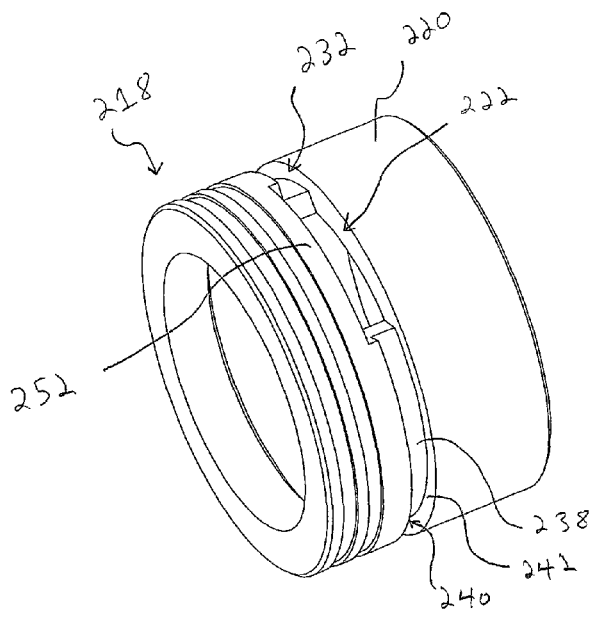
FIG. 12 is a perspective view of the locking sleeve of FIG. 11 showing a slot of the locking sleeve which receives the lock button.
Figure 13:
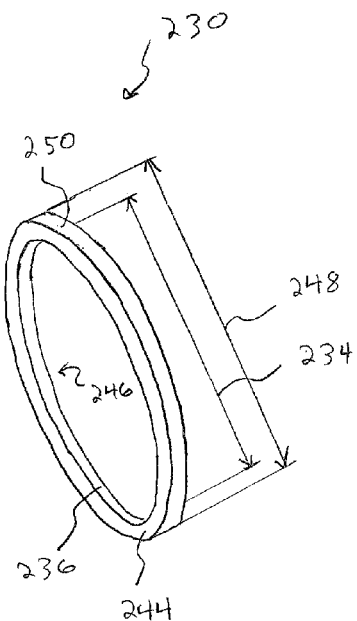
FIG. 13 is a perspective view of a biasing member which retains the lock button on the locking sleeve.

Turning to FIGS. 12 and 13, the locking sleeve 218 is illustrated with the rocker button 224 and the biasing member 230 removed. The locking sleeve 218 has a channel 232 that extends circumferentially around the locking sleeve 218 and is sized to receive the biasing member 230. The alignment of the slot opening 222 and the channel 232 permit the biasing member 230 to extend around the locking sleeve 218 and retain the rocker button 224 within the slot opening 222. As shown in FIG. 13, the biasing member 230 has an inner diameter 234 that is sized slightly smaller than an annular surface 238 of the channel 232 so that when the biasing member 230 is disposed in the channel 232, the resilient nature of the biasing member 230 radially constricts an inner surface 236 of the biasing member 230 against the annular surface 238. The engagement between the biasing member 230 and the locking sleeve 218 retains the biasing member 230 on the locking sleeve 218 despite vibrations or shocks that may occur during use of the second coupling member 200. Further, the channel 232 has opposed annular surfaces 240, 242 which are sized to snuggly receive the biasing member 230 with the annular surfaces 240, 242 abutting sidewalls 244, 246 of the biasing member 230. Biasing member 230 may also have an outer diameter 248 sized such that an outer surface 250 of the biasing member 230 is substantially flush with an outer surface 252 of the locking sleeve 218 when the biasing member 230 is connected to the locking sleeve 218. In one form, the biasing member 230 is a continuous elastic band made of neoprene, viton, or other resilient and durable material. Alternatively, the biasing member 230 may be a helical spring or other mechanism which biases the rocker button 224 radially inward. Further, the biasing member 230 may be integrally formed with the rocker button 224.

Figure 14:
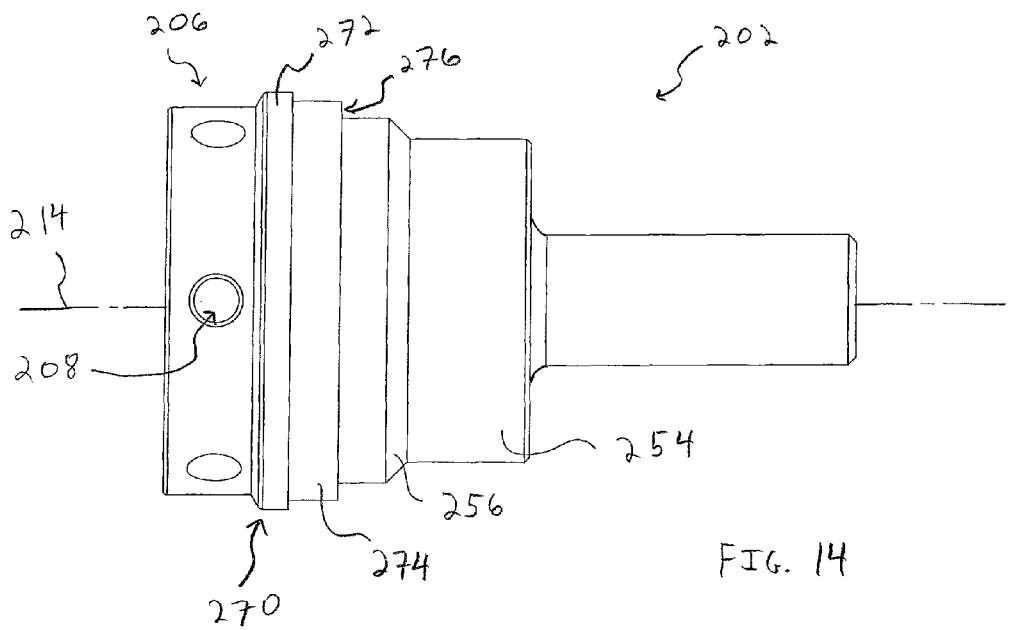
FIG. 14 is a side elevational view of a cup body of the second coupling member of FIG. 11 showing a radially extending flange which engages the lock button to restrict movement of the locking sleeve along the cup body.

With respect to FIG. 14, a side elevational view of the cup body 202 is shown. Cup body 202 is similar in a number of ways to the cup bodies 22, 122, such as the cylindrical outer surface 254 and stop surface 256, which generally control the movement of a washer 258 along the cup body 202 (i.e., see FIGS. 16 and 17). The cup body 202 also has a collar 270 which comprises two portions. The first portion is a radially extending flange 272 which is configured to contact the blocking portion 228 of the rocker button 224 when the rocker button 224 is in the interference position. The second portion of the collar 270 is a cylindrical portion 274 that includes an annular ledge or spring seat 276 which is similar to the spring seats 72, 156. In the illustrated embodiment, the collar 270 is longer along the central axis 214 than the collars 58, 154 due to presence of the radially extending flange 272 not present on the cup bodies 22, 122.

Figure 15A:
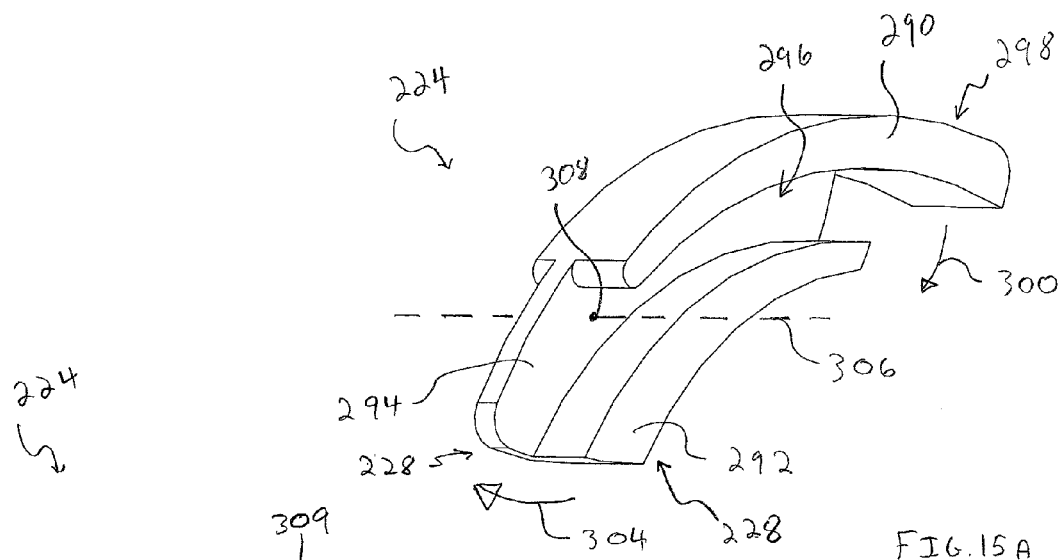
FIGS. 15A-15C are a series of views of the lock button of FIG. 11 showing a channel for receiving the biasing member of FIG. 13 and a blocking portion for engaging the radially extending flange of FIG. 14.

With respect to FIG. 15A, the rocker button 224 has a rearward shoulder 290 and a lip 292 which extend from a base 294 such that the rearward shoulder 290 and the lip 292 cooperate to define a channel 296 therebetween. A radially inward portion of the lip 292 serves as the blocking portion 228. The channel 296 is positioned and sized to receive the biasing member 230. In the illustrated embodiment, the rearward shoulder 290 also forms part of a radially outer tab or push button 298. Thus, the button 224 has the radially inward blocking portion 228 and the radially outward push button 298. The push button 298 permits a user to easily apply a leveraged force against the rocker button 224 to pivot the rocker button 224 relative to the locking sleeve 218. When the rocker button 224 is assembled on the locking sleeve 218, the radially outward push button 298 is exposed along the outer surface 252 of the locking sleeve 218 where it may be pressed by a user's hand or finger to shift the rocker button in a radial direction 300, which pivots the radially inward blocking portion 228 in a radial opposite direction 304. Further, pressing the push button 298 pivots the rocker button 224 about a pivot axis 306 that is generally perpendicular to the base 294 and intersects the base at a pivot point 308.

Figure 15B:
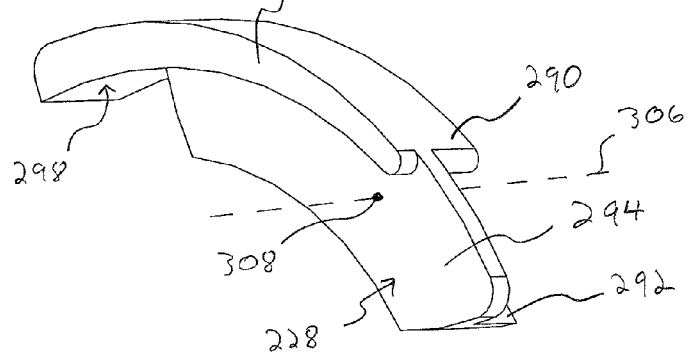

Turning to FIG. 15B, the rocker button 224 has a forward shoulder 309 which extends from the base 294 and is generally aligned with the rearward shoulder 290. The forward shoulder 309 extends along the channel 296 and projects axially over an outer surface 252 of the locking sleeve 218 (see FIG. 11). By projecting over the outer surface 252, the forward shoulder 309 can contact and pivot on the outer surface 252 as the rocker button 224 pivots about the pivot point 308. In one embodiment, the forward shoulder 309 has a radius of curvature that is larger than the radius of curvature of the outer surface 252 of the locking sleeve 218. In this manner, less than the entire forward shoulder 309 will contact the outer surface of the locking sleeve 218 in any pivot position of the rocker button 224.

Figure 15C:
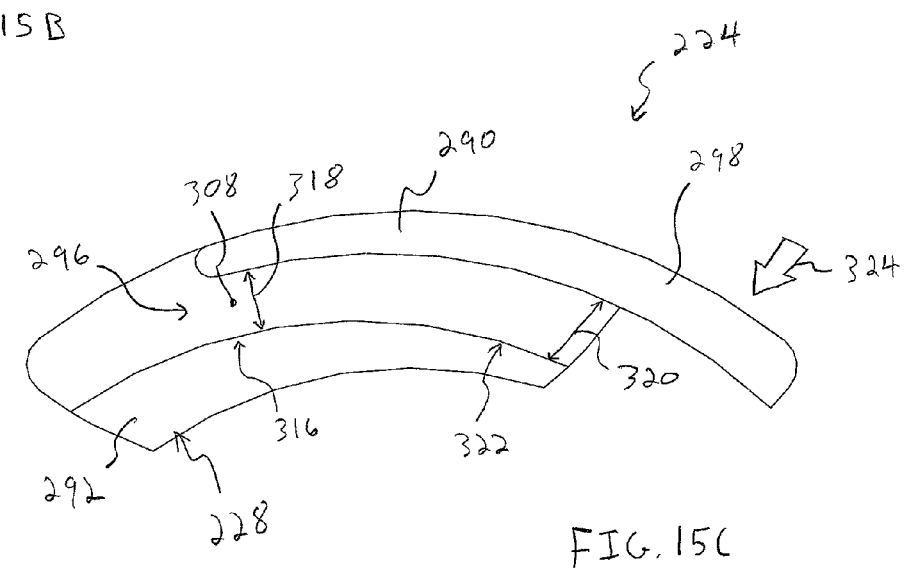

As shown in FIG. 15C, the rearward shoulder 290 and the lip 292 generally define a narrow or constricted portion 316 of the channel 296 having a width that is represented by distance 318. Extending away from the pivot point 308, the channel 296 gradually increases in width until reaching a distance 320 at a wide portion 322 of the channel 296. The distance 320 is slightly larger than the thickness of biasing member 230, whereas the distance 318 is slightly smaller than the thickness of the biasing member 230. This way, the rearward shoulder 290 and the lip 292 hold the biasing member 230 relatively tightly at the narrow portion 316 while having a slight separation from the biasing member 230 at the wide portion 322. The tight engagement between the rocker button 224 and the biasing member 230 permits the rocker button 224 to pivot about the biasing member 230 at the pivot point 308 when a force is applied in direction 324 against the push button 298. Conversely, the wide portion 322 of the channel 296 accommodates radial movement of the rearward shoulder 290 and the lip 292 as the rocker button 224 pivots about the pivot point 308.

Figure 18:
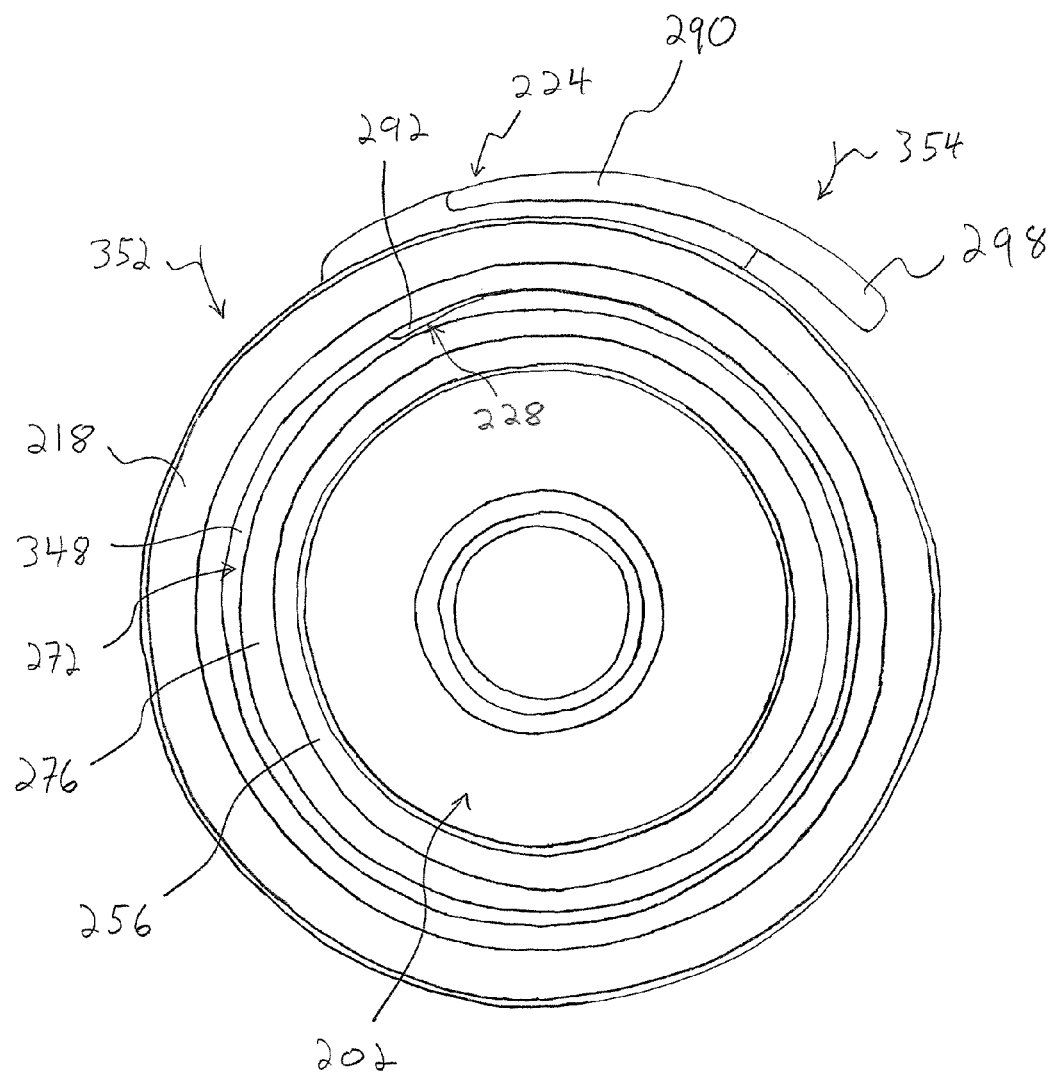
FIG. 18 is a rear elevational view of the coupling portion of FIG. 11 showing the lock button in the interference position of FIG. 16.

The operation of the second coupling member 200 will now be explained in more detail with reference to FIGS. 16-19. FIG. 16 is a cross-sectional view taken across line 16-16 in FIG. 11 and shows the rocker button 224 in the interference position. This interference position is also shown in FIG. 18, which is a rear view of the second coupling member 200. For clarity purposes, the washer 258, a snap ring 340, and a biasing member 344 shown in FIG. 16 have been removed in FIG. 18 to illustrate the radially projecting nature of the rocker button 224. As shown in FIG. 16, the rocker button 224 is disposed in the slot opening 222 between annular surfaces 240, 242. The biasing member 230 is restrained between the lip 292 and the rearward shoulder 290 while the forward shoulder 309 extends over the outer surface 252 of the locking sleeve 218. In the interference position, the biasing member 230 biases the rocker button 224 to a first pivot position where at least a portion thereof (i.e., the blocking portion 228) extends radially a distance 346 below an inner surface 336 of the locking sleeve 218 such that the blocking portion 228 of the rocker button 224 is radially shifted to an axially overlapping relation with a confronting surface 348 of the cup body flange 272. With the rocker button 224 in the interference position, an axial force or vibration along axis 214 generally would be unable to pivot the rocker button 224 in the radial direction 349. As such, the axial force or vibration would also be unable to shift the locking sleeve 218 in direction 350 to the unlocked position which would release the first coupling member 112 from the second coupling member 200.

Turning briefly to FIG. 18, the rocker button 224 is shown in the interference position, wherein the blocking portion 228 of the rocker button 224 projects radially inward from the locking sleeve 218 and is in axial overlapping relation with the flange 272 of the cup body 202. The biasing member 230 (not shown) generally biases the push button 298 of the rocker button 224 radially outward so that the blocking portion 228 at the opposite end of the button 224 is pivoted radially inward in direction 352. This keeps the blocking portion 228 of the rocker button 224 in overlapping relation with the confronting surface 348 until a force is applied in direction 354 against the push button 298.

Figure 19:
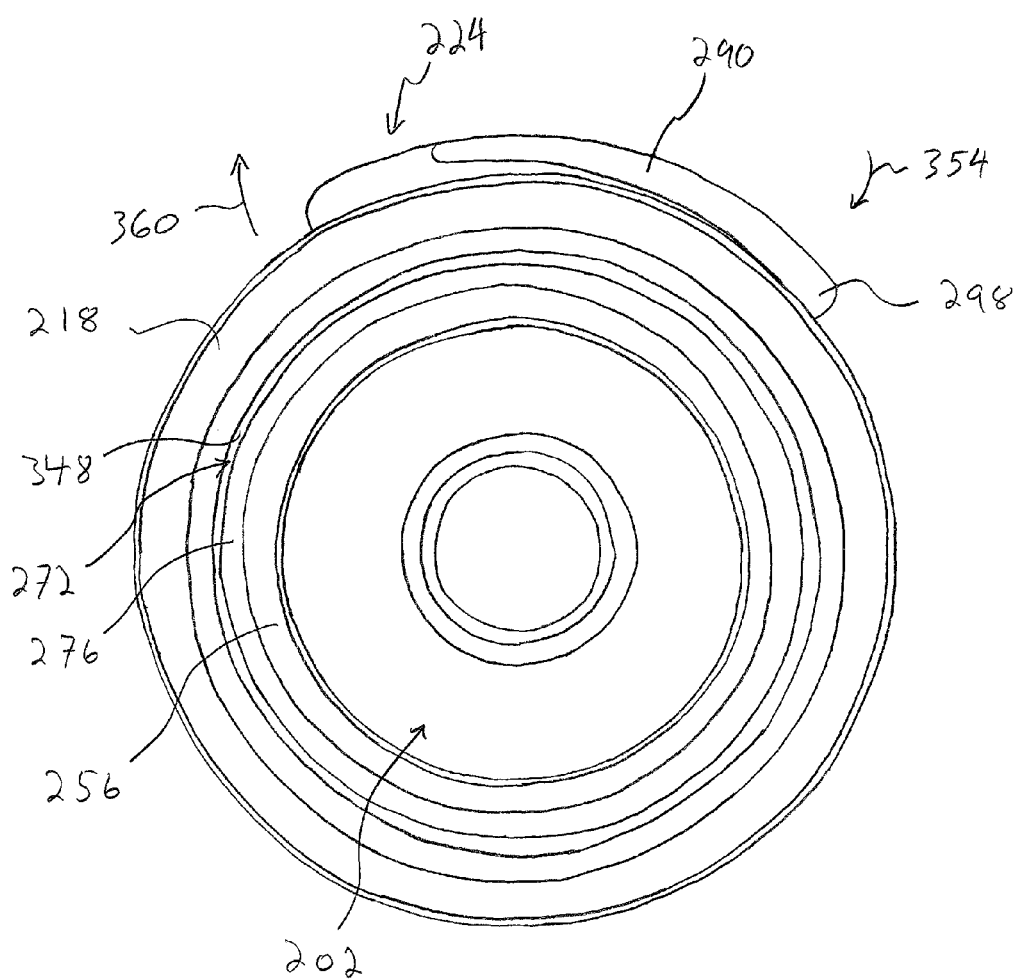
FIG. 19 is a rear elevational view showing the lock button in the clearance position of FIG. 17.

If this force is sufficient to overcome the bias force of the biasing member 230, the rocker button 224 pivots to the clearance position and the blocking portion 228 shifts radially outward in direction 360, as shown in FIGS. 17 and 19. By pivoting the rocker button 224 to the clearance position, a radial gap spacing 362 is produced between the flange 272 of the cup body 202 and the blocking portion 228 of the rocker button 224. The clearance position of the rocker button 224 readily permits the locking sleeve 218 to shift in direction 350 to the unlocked position which permits insertion or removal of the first coupling member 112.

Moreover, a user may readily grasp the locking sleeve 218 in one hand and shift the rocker button 224 between the interference position and the clearance position by using a finger to depress the push button 298. Such a one-handed operation permits a user to connect the first coupling member 112 and the second coupling member 200 by initially grasping the first coupling member 112 in one hand and grasping the second coupling member 200 in the other. Next, if the second coupling member 200 is facing upward to receive the first coupling member 112, the user presses the push button 298 inward with his thumb or index finger and pulls upward on the locking sleeve 218 to shift the locking sleeve 218 to the unlocked position such that the first coupling member 112 may be seated within the pocket 204. Finally, the user releases the push button 298 and the locking sleeve 218 and permits the biasing member 344 (FIGS. 16 and 17) to return the locking sleeve 218 to the locked position. In the illustrated form, the cup body 202 includes an inclined surface 366 (FIG. 17) which is positioned to contact and shift the rocker button 224 radially outward as the locking sleeve 218 returns to the locked position in direction 368. Once the locking sleeve 318 has returned to the locked position, the biasing member 230 biases the rocker button 224 back toward the interference position to lock the first coupling member 112 within the pocket 204.

An additional embodiment of a locking sleeve 400 is shown in FIGS. 20-24D in which a retention device or retention system 402 is provided to retain a lock device 404 coupled to the locking sleeve 400. By one approach, the retention device 402 is advantageous should a biasing member 406 of the lock device 404 break during operation because it holds the lock device on the sleeve. Also, the device 402 provides an additional level of safety for holding the locking sleeve 400 from shifting away from its locked position on a cup coupling portion, such as the cup body 202, in the event of failure of the biasing member 406.

The locking sleeve 400 is similar in a number of ways to locking sleeve 218 and may be slideably mounted to the cup body 202 and interface with the fastening elements 210, biasing member 344, washer 258, and snap ring 340 in a manner analogous to the locking sleeve 218 (see FIG. 16). Like the locking sleeve 218, the locking sleeve 400 includes a rocker button 408 of the lock device 404 partially disposed within a slot opening 410 of a wall 412 forming the locking sleeve 400. In this embodiment, the locking sleeve 400 has a pair of annular ribs 414, 416 extending circumferentially around the locking sleeve 400 above and below the slot opening 410. The ribs 414, 416 permit a user to more readily grasp the locking sleeve 400, as well as protect the lock device 404 (and in particular the button 408 and biasing member 406 thereof) from getting caught on tree branches or other debris in the surrounding environment. The ribs 414, 416 also help retain the biasing member 406 about the sleeve 400.

As shown in FIGS. 21A and 21B, the rocker button 408 is similar to the rocker button 224 described above and includes a radially inward blocking surface or portion 418 and a radially outward push button 420. The rocker button 408 also has a base 422 with a forward shoulder 423 forming the push button 420 and rearward retaining posts 424, 426 forming a portion of the retention device 402. The forward shoulder 423 and posts 424, 426 project upwardly from the base 422. By one approach, the posts 424, 426 have a profile generally resembling a parallelogram, with inclined generally parallel sides 428, 430 and 432, 434 (respectively), upper sides 436 and 438 and lower sides 440 and 442. Further, the corners of the posts 424, 426 may be rounded to provide smooth transitions between the sides of the posts 424, 426. The posts 424, 426 may alternatively be shaped as cylinders, cubes, or various other configurations.

In one embodiment, the inclined sides 428, 430 and 432, 434 have an angle of inclination that is generally complimentary to an angle of inclination of a pair of relief holes or cutouts 444, 446 forming another portion of the retention device 402 adjacent to the slot opening 410. As a result, the posts 424, 426 may slide within the cutouts 444, 446, respectively, as the rocker button 408 pivots between clearance and interference positions (see FIGS. 24A-24D). As will be discussed in greater detail below, the posts 424, 426 are arranged and configured to be received within the cutouts 444, 446 and partially restrict movement of the rocker button 408 in a radial direction (see FIG. 24D). Thus, when the locking sleeve 400 is slideably mounted on the cup body 202, the rocker button 408 will not fall out of the locking sleeve cutout 410 due to the retention device 402 even if the biasing member 406 is torn, removed, or otherwise inadvertently shifted from the locking sleeve 400 during use.

Figure 22:
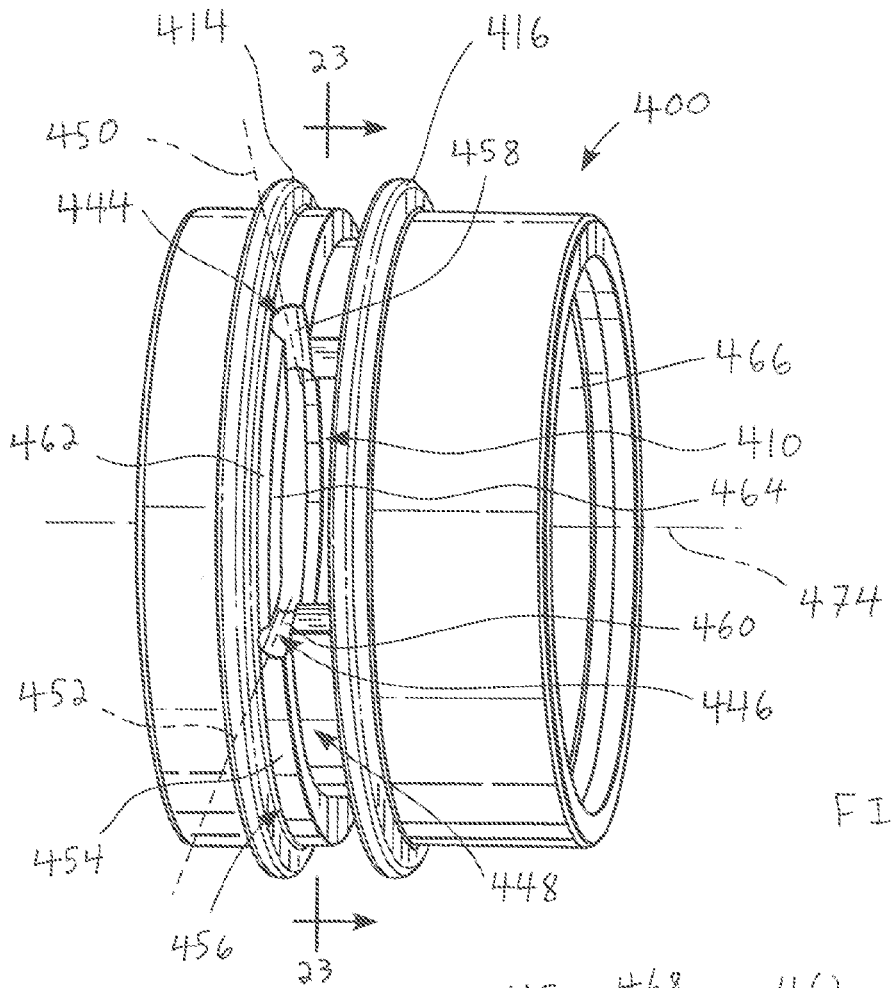
FIG. 22 is a perspective view of the locking sleeve of FIG. 20 shown with the biasing member and the lock button removed to show a slot sized for receipt of the locking sleeve and including relief holes at opposite ends of the slot.

Turning to FIG. 22, the locking sleeve 400 is illustrated with the biasing member 406 and the rocker button 408 removed for clarity. The locking sleeve 400 has an annular channel 448 that extends circumferentially around the locking sleeve 400 outer wall and is sized to receive the biasing member 406. The slot opening 410 is aligned with the channel 448 to permit the biasing member 406 to extend around the locking sleeve 400 and retain the rocker button 408 within the slot opening 410 as discussed with the previous embodiment. In the embodiment shown in FIG. 22, the locking sleeve 400 has the cutouts 444, 446 disposed at opposite ends of the slot opening 410 and, in particular, at upper corners of the opposite ends of the slot opening 410.

With continued reference to FIG. 22, the combination of the cutouts 444, 446 and the slot opening 410 defines a ledge 462 extending between the opening 410 and the rib 414. The ledge 462 corresponds to the outer surface 252 of the locking sleeve 218 (see FIGS. 16 and 17) and is positioned as a seating surface for the forward shoulder 423 of the rocker button 408, which extends over the ledge 462 when the rocker button 408 is mounted on the locking sleeve 400. When the radially outward push button 420 of the rocker button 408 is pressed, the forward shoulder 423 of the rocker button 408 can contact and pivot on the ledge 462 as the rocker button 408 pivots between clearance and interference positions similar to the previous embodiments. Further, the base 422 of the rocker button 408 may be in close abutting contact with an upper surface 464 of the slot opening 410 such that the base 422 can transmit axial loads between the locking sleeve 400 and the cup body 202.

Figure 23:
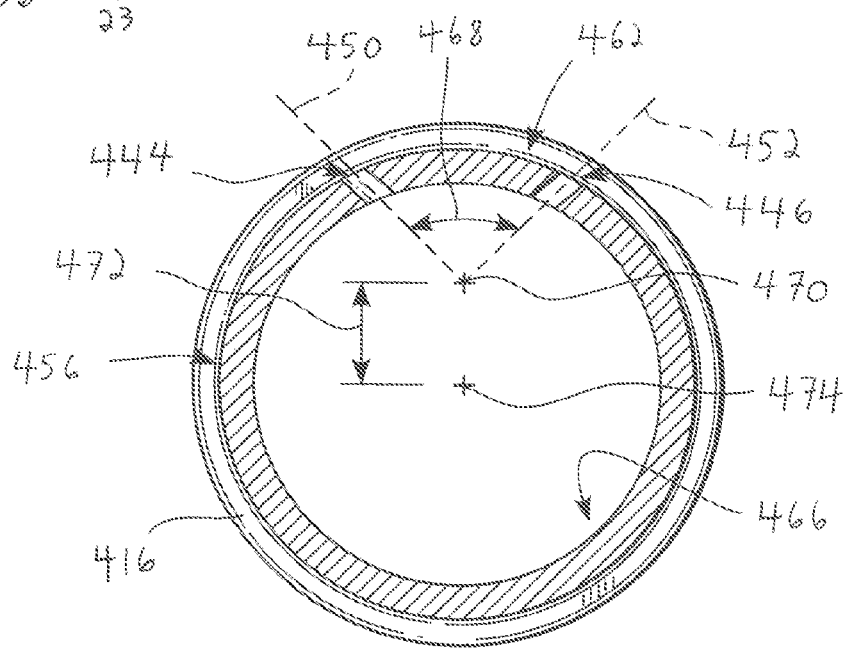
FIG. 23 is a cross-sectional view of the locking sleeve of FIG. 22 taken across line 23-23 showing the relief holes inclined relative to one another.

FIG. 23 shows a cross-sectional view of the locking sleeve 400 taken across line 23-23 in FIG. 22. As shown in FIG. 23, the cutouts 444, 446 extend through an intermediate wall portion 456 to an inner surface 466 of the locking sleeve 400 and define side edges of the ledge 462. Preferably, the cutouts 444, 446 extend along respective axes or centerlines 450, 452 at angles that are generally transverse to an outer surface 454 of an intermediate wall portion 456 of the locking sleeve 400. The cutouts 444, 446 may be a variety of configurations, although in the embodiment shown, the cutouts 444, 446 form an inclined bore extending through the sleeve wall and have generally rounded inner surfaces 458, 460 extending around the associated centerlines 450, 452. By one approach, the centerlines 450, 452 are oriented at an oblique angle 468 relative to one another and intersect at a point 470 a distance 472 above a central axis 474 of the locking sleeve 400. In the embodiment shown, the angle 468 corresponds generally to the angle of inclination of the side walls 428, 430, 432, and 434 of the retention posts 424 and 426.

Figure 24A:
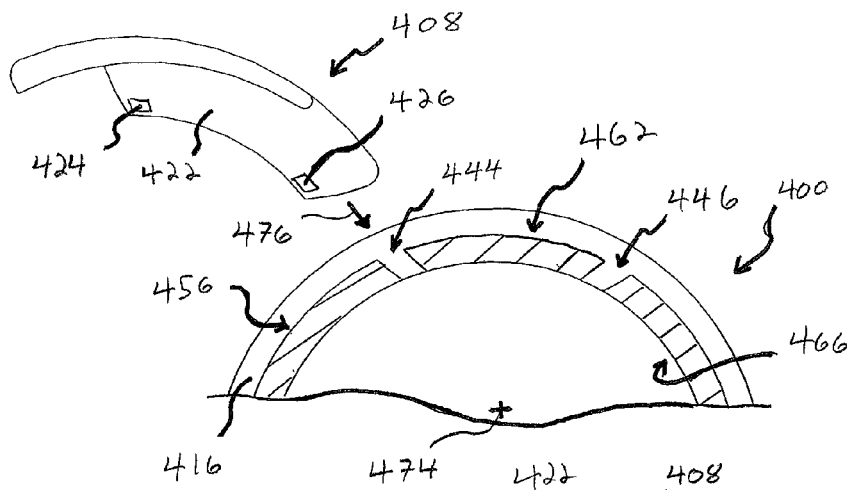
FIGS. 24A-24D are a series of partial cross sectional views of the locking sleeve showing a coupling between the lock button and the slot of the locking sleeve.
Figure 24B:
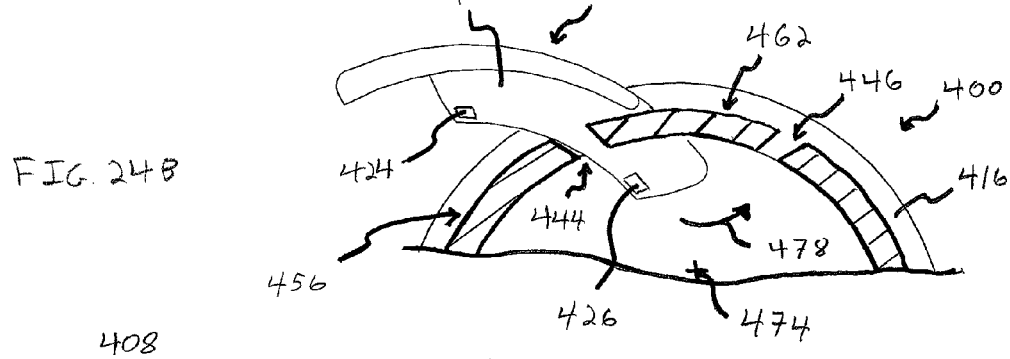
Figure 24C:
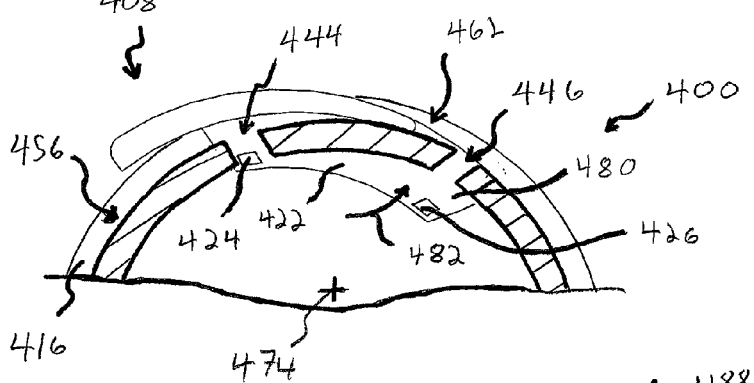

Turning now to FIGS. 24A-24D, a coupling between the locking sleeve 400 and rocker button 408 is shown to illustrate the retention device 402. More particularly, FIGS. 24A-24D illustrate the process of inserting the base 422 of the rocker button 408 into the slot opening 410 of the locking sleeve 400 before the biasing member 406 is mounted on the locking sleeve 400 to retain the rocker button 408 thereon. Initially, the rocker button 408 is radially positioned relative to the locking sleeve 400 with the post 426 being aligned with the cutout 444, as shown in FIG. 24A. The rocker button 408 is inserted in direction 476 such that the base 422 of the rocker button 408 enters the slot opening 410 and the post 426 passes through cutout 444, as shown in FIG. 24B. Next, the rocker button 408 is rotated in direction 478 to move the post 426 toward the cutout 446, which brings the post 424 into the cutout 444, and positions a larger portion of the rocker button base 422 within the slot opening 410. As shown in FIG. 24C, the post 424 passes through the cutout 444 and is brought toward the central axis 474 of the locking sleeve 400 while the leading end 480 of the rocker button 408 is rotated upward in direction 482 to bring the post 426 into the cutout 446.

Figure 24D:
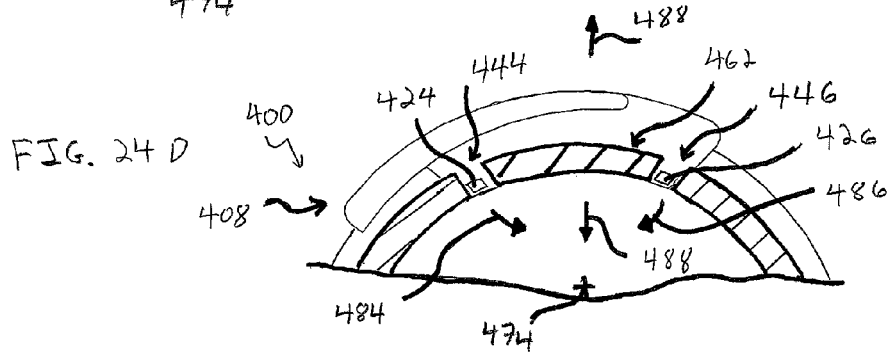

The final position of the rocker button 408 is shown in FIG. 24D, wherein the base 422 is positioned within the slot opening 410 and the posts 424, 426 are slideably located within or adjacent to the respective cutouts 444, 446. Now, the biasing member 406 may be expanded, passed over the wall 412 of the locking sleeve 400, coupled with the rocker button 408, and released such that its elastic properties contract the biasing member 406 in the channel 448 and securely connect the rocker button 408 to the locking sleeve 400 similar to the other embodiments. The assembled locking sleeve 400 may then be slideably mounted on the cup body 202.

When the cup body 202 is positioned within the locking sleeve 400, the rocker button 408 may pivot between clearance and interference positions similar to the previous embodiments. The rocker button 408, however, can only pivot a limited amount in either direction 484 or 486 before contacting the cup body 202, as shown in FIG. 24D. The cup body 202 also limits the rocker button 408 from shifting radially inward in direction 488. Further, the distance between the cutouts 444, 446 gradually increases as the cutouts 444, 446 extend away from the central axis 474 of the locking sleeve 400. The posts 424, 426 of the rocker button 408, however, are a fixed distance apart. Thus, when the rocker button 408 is shifted radially outward in direction 488, the interference between the posts 424, 426 and the ledge 462 restricts movement of the rocker button 408 beyond a fixed radial position. In this manner, even if the biasing member 406 were to break when the locking sleeve 400 is mounted on the cup body 202, the rocker button 408 is restricted from falling off of the locking sleeve 400. By retaining the rocker button 408 on the locking sleeve 400, the locking sleeve 400 is less likely to shift to an unlocked position which could produce an inadvertent release of the pin coupling member from the cup coupling portion.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:
1. A trailer hitch coupling device comprising:
a first hitch coupling portion having a head portion;
a second hitch coupling portion having a receiving body with a central axis and including a pocket therein through which the axis extends and being sized to receive the head portion of the first hitch coupling portion;
an opening of the receiving body for providing the head portion access to the pocket;
a wall of the receiving body extending about the pocket and having at least one radially extending bore therethrough in communication with the pocket;
a fastening element received in the radially extending bore and configured to translate therein between an unlocked position where the fastening element does not extend into the pocket for permitting the head portion of the first hitch coupling portion to be inserted into the pocket and a locked position where a portion of the fastening element protrudes into the pocket for retaining the head portion of the first hitch coupling portion therein;
a locking sleeve slideably mounted to the wall of the receiving body; and
a biasing member between the receiving body wall and the locking sleeve for urging the locking sleeve axially away from the opening to a locked position with the fastening element in the locked position, the locking sleeve being axially slideable toward the opening to an unlocked position against the bias of the biasing member to allow the fastening element to translate to the unlocked position thereof.

2. The trailer hitch coupling device of claim 1, wherein the locking sleeve has an inner surface sized and positioned to extend axially beyond the radially extending bore of the receiving body wall and toward the receiving body opening so that the inner surface covers the bore in both the locked and unlocked positions of the locking sleeve.

3. The trailer hitch coupling device of claim 1, wherein the locking sleeve has an inner surface positioned to slideably engage a portion of the receiving body wall that extends axially between the radially extending bore and the opening of the receiving body when the locking sleeve is in both the unlocked and locked positions to keep the fastening element from being exposed to fouling from the outside environment.

4. The trailer hitch coupling device of claim 1, wherein the locking sleeve has an annular wall including an inner surface having a continuous, axially extending recess therein sized to receive the biasing member therein and to receive a portion of the fastening element therein in the unlocked position thereof.

5. The trailer hitch coupling device of claim 4, wherein the receiving body wall has a radially enlarged collar portion extending into the annular wall recess to divide the recess into a first recess portion for receiving the biasing member therein and a second recess portion into which the portion of the fastening element is received in the unlocked position thereof.

6. The trailer hitch coupling device of claim 1, wherein the wall of the receiving body and the locking sleeve having inclined mating surfaces that are spaced apart from each other with the locking sleeve in the unlocked position and that are arranged to contact flush against each other with the locking sleeve in the locked position such that the inclined mating surface of the receiving body limits movement of the locking sleeve in the axial direction away from the receiving body opening.

7. A coupling device comprising:
a pin coupling member having a head portion;
a cup coupling portion having a body with a central axis thereof and including a pocket therein through which the central axis extends and being sized to receive the head portion of the pin coupling member therein;
an opening of the body for providing the head portion access to the pocket;
a locking sleeve slideably mounted to the cup body;
a coil spring having coils that extend about the cup body for biasing the locking sleeve to a locked position so that the head portion of the pin received in the pocket is retained therein, the locking sleeve being slideable against the bias of the coil spring to an unlocked position where the pin coupling member can be inserted in or removed from the pocket; and
stop surfaces of the cup body and locking sleeve that engage each other with the locking sleeve slid to the unlocked position and being arranged so that when engaged the adjacent coils of the coil spring are not fully compressed against each other.

8. The coupling device of claim 7, wherein the locking sleeve stop surface is sized to include a spring seat portion thereof to support one end of the coil spring thereon.

9. The coupling device of claim 8, wherein the locking sleeve includes an annular wall and an annular washer member extending radially inward therefrom with the locking sleeve stop surface being an inner diameter portion of the annular washer member that engages a portion of the body with the locking sleeve slid to the unlocked position and the spring seat portion being an outer diameter portion of the annular washer member.

10. A vehicle coupling system comprising:
a trailer having a tongue;
a vehicle for pulling the trailer;
a coupling member mounted to the tongue of the trailer to extend along a hitching axis and having a ball head portion depending below the trailer tongue;
a cup body fixedly mounted to the vehicle and including an upwardly opening pocket that is stationary relative to the vehicle; and
a locking mechanism mounted to the cup body so that with the stationary cup body pocket positioned below the ball coupling member and the hitching axis extending through the pocket, the head portion of the coupling member can be lowered in a downward direction along the hitching axis to seat the head portion in the stationary pocket without requiring movement of the stationary pocket to allow the locking mechanism to be operable to lock the head portion therein.

11. A vehicle coupling system comprising:
a trailer having a tongue;
a vehicle for pulling the trailer;
a coupling member mounted to the tongue of the trailer to extend along a hitching axis and having a ball head portion depending below the trailer tongue;
a cup body mounted to the vehicle and including an upwardly opening pocket; and
a locking mechanism mounted to the cup body so that with the cup body pocket positioned below the ball coupling member and the hitching axis extending through the pocket, the head portion of the coupling member can be lowered in a downward direction along the hitching axis to seat the head portion in the pocket with the locking mechanism operable to lock the head portion therein;
wherein the locking mechanism comprises a locking sleeve mounted to the cup body with the sleeve being operable to be slid in an upward direction along the hitching axis from a locked position to an unlocked position opposite to the downward direction in which the head portion is lowered into the pocket to allow the head portion to be received therein or removed therefrom such that the opposite movements of the head portion and the sleeve along the hitching axis bring the coupling member and cup body toward each other for coupling of the trailer to the vehicle.

12. The coupling system of claim 11, wherein the locking mechanism includes locking detent elements that are radially shifted from locking positions at least partially in the pocket to unlocked positions outside the pocket as the sleeve is shifted between locked and unlocked positions thereof.

13. The coupling system of claim 11, wherein the locking mechanism includes a biasing member between the locking sleeve and the cup body that urges the locking sleeve in the downward direction along the hitching axis to a locked position to retain the ball head portion in the pocket.

14. A vehicle coupling system comprising:
a trailer having a tongue;
a vehicle for pulling the trailer;
a coupling member mounted to the tongue of the trailer to extend along a hitching axis and having a ball head portion depending below the trailer tongue;
a cup body mounted to the vehicle and including an upwardly opening pocket; and
a locking mechanism mounted to the cup body so that with the cup body pocket positioned below the ball coupling member and the hitching axis extending through the pocket, the head portion of the coupling member can be lowered in a downward direction along the hitching axis to seat the head portion in the pocket with the locking mechanism operable to lock the head portion therein;

wherein the coupling member includes an integral shank depending from the ball head portion formed in one-piece therewith so that the coupling member can be fabricated through a cold heading process to increase the durability thereof, and a removable collar configured to be slideably mounted on the shank for positioning the ball head portion spaced from the trailer tongue.

15. A vehicle coupling system comprising:
a trailer having a tongue;
a vehicle for pulling the trailer;
a coupling member mounted to the tongue of the trailer to extend along a hitching axis and having a ball head portion depending below the trailer tongue;
a cup body mounted to the vehicle and including an upwardly opening pocket; and
a locking mechanism mounted to the cup body so that with the cup body pocket positioned below the ball coupling member and the hitching axis extending through the pocket, the head portion of the coupling member can be lowered in a downward direction along the hitching axis to seat the head portion in the pocket with the locking mechanism operable to lock the head portion therein;
wherein the cup body includes a throughbore having an axis extending along the hitching axis for draining fluids from the upwardly opening pocket.

16. The coupling system of claim 15, wherein the cup body includes a central, elongate mounting member depending from the cup body extending along the hitching axis, and the throughbore extends through the central elongate mounting member for draining fluids from the upwardly opening pocket through the central elongate mounting member.

17. A method of hitching a trailer to a vehicle, the method comprising:
arranging a depending coupling member of the trailer over an upwardly opening cup member of the vehicle;
pulling a downwardly biased locking sleeve upwardly along the cup member against its bias to allow locking elements to shift to unlocked positions thereof;
seating the coupling member in the cup member by either using the upward pulling force applied to the locking sleeve to pull the cup member upwardly toward the coupling member thereover, lowering the coupling member toward the cup member and the upwardly pulled locking sleeve, or both; and
releasing the locking sleeve to permit the locking sleeve to shift downwardly and shift the locking elements to locked positions thereof for locking the coupling member in the cup member.

18. The method of claim 17, wherein using the upward pulling force applied to the locking sleeve to pull the cup member upwardly toward the coupling member includes engaging a stop portion of the locking sleeve with a corresponding stop portion of the cup member so that the engagement of the stop portions permits a continued upward motion of the locking sleeve to urge the cup member upwardly toward the coupling member.

19. The method of claim 17, wherein pulling the locking sleeve upwardly along the cup member permits the locking elements to shift radially outward so that the locking elements do not extend into a pocket of the cup member such that the pocket is configured for receipt of a ball head portion of the coupling member therein.

20. A coupling device comprising:
a pin coupling member having a head portion;
a cup coupling portion having a body with a central axis thereof and including a pocket therein through which the central axis extends and being sized to receive the head portion of the pin coupling member therein;
a locking sleeve slideably mounted to the cup body and configured for being shifted along the central axis from an unlocked position where the head portion can be inserted or removed from the pocket to a locked position for retaining the head portion in the pocket; and
a locking member mounted to the locking sleeve to be shifted relative to the locking sleeve between an interference position where a blocking portion of the locking member is positioned to block sliding of the locking sleeve along the cup body and a clearance position where the blocking portion is positioned to allow sliding of the locking sleeve between its locked and unlocked positions.

21. The coupling device of claim 20, wherein the locking sleeve includes a slot opening therein through which the locking member extends.

22. The coupling device of claim 20, further comprising a biasing member on the locking sleeve for biasing the blocking portion to the interference position and the biasing member is configured so that a pressing motion of the locking member counter-biases the biasing member to shift the blocking portion to the clearance position.

23. The coupling device of claim 20, wherein the cup body includes a radially extending flange and the blocking portion of the locking member is positioned to engage the radially extending flange when in the interference position to block sliding of the locking sleeve.

24. The coupling device of claim 20, wherein the locking member has a retention device to maintain the locking member mounted to the locking sleeve.

25. The coupling device of claim 24, wherein the locking sleeve includes a slot opening therein through which the locking member extends; and
the retention device includes cutouts on opposite ends of the slot and a pair of posts on opposite ends of the locking member where one of the locking member posts are slideably received in each of the cutouts.

26. The coupling device of claim 25, wherein the cutouts extend along axes that are oriented at an oblique angle relative to one another.

27. A trailer hitch coupling device comprising:
a pin coupling member having a head portion;
a cup body having a central axis and including a pocket therein through which the axis extends, the pocket being sized to receive the head portion of the pin coupling member, the cup body including a wall extending about the pocket;
a locking sleeve slideably mounted to the wall of the cup body;
a biasing member between the locking sleeve and the cup body wall for urging the locking sleeve to a locked position for retaining the head portion of the pin coupling member in the pocket, the locking sleeve being axially slideable to an unlocked position against the bias of the biasing member to allow the head portion of the pin coupling member to be inserted and removed from the pocket; and a rocker button mounted to the locking sleeve having a radially inward blocking portion and a radially outward push button, the rocker button configured to pivot relative to the locking sleeve so that in a first pivot position the radially inward blocking portion is positioned to block movement of the locking sleeve and in a second, opposite pivot position the radially inward blocking portion is positioned to allow sliding of the locking sleeve.

28. The trailer hitch coupling device of claim 27, wherein the rocker button includes a pivot configured so that rocker button is capable of rocking back and forth thereabout from the first pivot position where the blocking portion extends radially inward relative to the looking sleeve to a position for engaging the cup body to block sliding of the locking sleeve and to the second pivot position when the push button is pressed radially inward so that the blocking portion of the rocker button is shifted radially outward and spaced from the cup body forming a radial gap separating the blocking portion and the cup body for permitting sliding of the locking sleeve.

29. The trailer hitch coupling device of claim 27, further comprising a resilient member mounted to the locking sleeve for biasingly pivoting the rocker button toward the first pivot position and permitting radial pushing of the push button to counter-bias the resilient member for shifting the blocking portion outward to the second pivot position to be spaced from the cup body.

30. The trailer hitch coupling device of claim 29, wherein the rocker button includes a channel to receive the resilient member wherein the channel is radially wider adjacent the push button and radially narrower adjacent to the blocking portion such that the rocker button pivots about the radially narrower portion.

31. The trailer hitch coupling device of claim 30, wherein the rocker button has a curved shoulder member extending along the channel and projecting axially over the locking sleeve, the curved shoulder member contacting the locking sleeve and pivoting thereon as the rocker button pivots about the pivot point.

32. The trailer hitch coupling device of claim 27, wherein the push button is a projecting tab disposed radially outward of the locking sleeve and at least a portion thereof is mounted to extend over the locking sleeve and provides leverage for pivoting the rocker button.

33. The trailer hitch coupling device of claim 27, wherein the locking sleeve includes a slot opening though with the blocking portion extends.

34. The trailer hitch coupling device of claim 27, wherein the wall of the cup body includes a radially outwardly extending flange in a position to be engaged by the rocker button blocking portion when pivoted to the first pivot position.

* * * * *